United States Patent
Hassett et al.

(12) 
(10) Patent No.: US 6,173,311 B1
(45) Date of Patent: *Jan. 9, 2001

(54) APPARATUS, METHOD AND ARTICLE OF MANUFACTURE FOR SERVICING CLIENT REQUESTS ON A NETWORK

(75) Inventors: Gregory P. Hassett, Cupertino, CA (US); Harry Collins, South Orange, NJ (US); Vibha Dayal, Saratoga, CA (US)

(73) Assignee: PointCast, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/800,153

(22) Filed: Feb. 13, 1997

(51) Int. Cl.⁷ .................................................. G06F 15/16
(52) U.S. Cl. ........................ 709/202; 709/217; 709/105
(58) Field of Search .................... 395/200.47, 200.48, 395/200.49; 707/201, 202, 203; 709/217, 218, 219, 202, 105

(56) References Cited

U.S. PATENT DOCUMENTS

| | | | |
|---|---|---|---|
| 3,848,193 | 11/1974 | Martin et al. | 325/53 |
| 3,987,398 | 10/1976 | Fung | 325/309 |
| 4,170,782 | 10/1979 | Miller | 358/84 |
| 4,186,413 | 1/1980 | Mortimer | 358/146 |
| 4,224,644 | 9/1980 | Lewis et al. | 360/72.2 |
| 4,287,592 | 9/1981 | Paulish et al. | 370/88 |
| 4,288,809 | 9/1981 | Yabe | 358/12 |
| 4,305,101 | 12/1981 | Yarbrough et al. | 360/69 |
| 4,307,446 | 12/1981 | Barton et al. | 364/200 |
| 4,338,644 | 7/1982 | Staar | 360/132 |
| 4,347,498 | 8/1982 | Lee et al. | 340/825.02 |
| 4,381,522 | 4/1983 | Lambert | 358/86 |

(List continued on next page.)

FOREIGN PATENT DOCUMENTS

| | | |
|---|---|---|
| 0113022 | 11/1984 | (EP) . |
| 0206565 | 12/1986 | (EP) . |
| 2034995 | 6/1980 | (GB) . |
| 2141907 | 1/1985 | (GB) . |
| 2185670 | 7/1987 | (GB) . |
| 2207314 | 1/1989 | (GB) . |
| 2256549 | 12/1992 | (GB) . |
| 2281434 | 3/1995 | (GB) . |
| 88/04507 | 6/1988 | (WO) . |
| 90/07844 | 7/1990 | (WO) . |
| 92/12488 | 7/1992 | (WO) . |
| 93/09631 | 5/1993 | (WO) . |
| 93/19427 | 9/1993 | (WO) . |
| 95/31069 | 11/1995 | (WO) . |
| 96/30864 | 10/1996 | (WO) . |
| 96/34466 | 10/1996 | (WO) . |

OTHER PUBLICATIONS

Article, "There's more to one–way addressability than meets the eye".

Article, "VCR Technology", No. 4 in a series of reports from Mitsubishi R&D, Video Review, Jan. 1989.

Article, "DIP II", The Ultimate Program Guide Unit from the ultimate listings company.

K. Birman, et al., "The ISIS System Manual", By the ISIS Project, Mar. 15, 1988, pp 1–15.

K. Birman, et al., Programming Your Way Out Of The Past ISIS and The Meta Project, Sun Technology, Summer 1989, pp 90–104.

(List continued on next page.)

*Primary Examiner*—Dung C. Dinh
(74) *Attorney, Agent, or Firm*—Blakely, Sokoloff, Taylor & Zafman

(57) ABSTRACT

A server services client requests in an improved manner by a utilizing a combination of sending an id of the last article that has been previously sent to the client, load balancing servers to provide efficient servicing of clients and providing redundant servers so that a failure of any one server does not result in the termination of server services to clients.

21 Claims, 26 Drawing Sheets

U.S. PATENT DOCUMENTS

| | | | |
|---|---|---|---|
| 4,405,946 | 9/1983 | Knight | 358/192.1 |
| 4,429,385 | 1/1984 | Cichelli et al. | 370/92 |
| 4,476,488 | 10/1984 | Merrell | 358/86 |
| 4,477,695 | 10/1984 | Buck | 178/3 |
| 4,488,179 | 12/1984 | Kruger et al. | 358/181 |
| 4,519,029 | 5/1985 | Thompson | 364/200 |
| 4,536,791 | 8/1985 | Campbell et al. | 358/122 |
| 4,575,579 | 3/1986 | Simon et al. | 178/4 |
| 4,587,514 | 5/1986 | Schas et al. | 340/347 |
| 4,602,279 | 7/1986 | Freeman | 358/86 |
| 4,641,205 | 2/1987 | Beyers, Jr. | 360/33.1 |
| 4,645,873 | 2/1987 | Chomet | 379/93 |
| 4,677,434 | 6/1987 | Fascenda | 380/23 |
| 4,677,466 | 6/1987 | Lert, Jr. et al. | 358/84 |
| 4,691,351 | 9/1987 | Hayashi et al. | 380/10 |
| 4,691,354 | 9/1987 | Palminteri | 380/15 |
| 4,701,794 | 10/1987 | Froling et al. | 358/147 |
| 4,703,423 | 10/1987 | Bado et al. | 364/400 |
| 4,706,121 | 11/1987 | Young | 358/142 |
| 4,722,005 | 1/1988 | Ledenbach | 358/168 |
| 4,745,559 | 5/1988 | Willis et al. | 364/514 |
| 4,751,578 | 6/1988 | Reiter et al. | 358/183 |
| 4,751,669 | 6/1988 | Sturgis et al. | 364/900 |
| 4,768,110 | 8/1988 | Dunlap et al. | 360/33.1 |
| 4,775,935 | 10/1988 | Yourick | 364/401 |
| 4,788,682 | 11/1988 | Vij et al. | 370/110.1 |
| 4,814,972 | 3/1989 | Winter et al. | 364/200 |
| 4,815,030 | 3/1989 | Cross et al. | 364/900 |
| 4,821,102 | 4/1989 | Ichikawa et al. | 358/183 |
| 4,823,122 | 4/1989 | Mann et al. | 340/825.28 |
| 4,829,569 | 5/1989 | Seth-Smith et al. | 380/10 |
| 4,866,700 | 9/1989 | Berry et al. | 370/58.1 |
| 4,868,866 | 9/1989 | Williams, Jr. | 380/49 |
| 4,873,662 | 10/1989 | Sargent | 364/900 |
| 4,890,321 | 12/1989 | Seth-Smith et al. | 380/20 |
| 4,899,394 | 2/1990 | Lee | 382/9 |
| 4,908,707 | 3/1990 | Kinghorn | 358/147 |
| 4,908,713 | 3/1990 | Levine | 358/335 |
| 4,974,149 | 11/1990 | Valenti | 364/200 |
| 4,975,904 | 12/1990 | Mann et al. | 370/85.1 |
| 4,977,455 | 12/1990 | Young | 358/142 |
| 4,987,496 | 1/1991 | Greivenkamp | 358/448 |
| 4,991,011 | 2/1991 | Johnson et al. | 358/141 |
| 4,992,940 | 2/1991 | Dworkin | 364/401 |
| 4,994,908 | 2/1991 | Kuban et al. | 358/86 |
| 4,994,909 | 2/1991 | Graves et al. | 358/86 |
| 5,001,554 | 3/1991 | Johnson et al. | 358/86 |
| 5,008,853 | 4/1991 | Bly et al. | 364/900 |
| 5,053,883 | 10/1991 | Johnson | 358/349 |
| 5,058,108 | 10/1991 | Mann et al. | 370/85.1 |
| 5,075,771 | 12/1991 | Hashimoto | 358/84 |
| 5,077,607 | 12/1991 | Johnson et al. | 358/86 |
| 5,099,319 | 3/1992 | Esch et al. | 358/86 |
| 5,105,184 | 4/1992 | Pirani et al. | 340/721 |
| 5,131,020 | 7/1992 | Liebesny et al. | 379/59 |
| 5,133,075 | 7/1992 | Risch | 395/800 |
| 5,151,789 | 9/1992 | Young | 358/194.1 |
| 5,177,680 | 1/1993 | Tsukino et al. | 364/401 |
| 5,182,640 | 1/1993 | Takano | 358/86 |
| 5,187,787 | 2/1993 | Skeen et al. | 395/600 |
| 5,200,823 | 4/1993 | Yoneda et al. | 358/146 |
| 5,220,420 | 6/1993 | Hoarty et al. | 358/86 |
| 5,220,501 | 6/1993 | Lawlor et al. | 364/408 |
| 5,220,657 | 6/1993 | Bly et al. | 395/425 |
| 5,230,048 | 7/1993 | Moy | 395/600 |
| 5,231,493 | 7/1993 | Apitz | 358/146 |
| 5,261,042 | 11/1993 | Brandt | 395/156 |
| 5,265,033 | 11/1993 | Vajk et al. | 364/514 |
| 5,276,869 | 1/1994 | Forrest et al. | 395/600 |
| 5,283,639 | 2/1994 | Esch et al. | 348/6 |
| 5,283,731 | 2/1994 | Lalonde et al. | 364/401 |
| 5,285,272 | 2/1994 | Bradley et al. | 348/6 |
| 5,301,028 | 4/1994 | Banker et al. | 348/570 |
| 5,305,195 | 4/1994 | Murphy | 364/401 |
| 5,319,455 | 6/1994 | Hoarty et al. | 348/7 |
| 5,319,707 | 6/1994 | Wasilewski et al. | 380/14 |
| 5,321,750 | 6/1994 | Nadan | 380/20 |
| 5,327,554 | 7/1994 | Palazzi, III et al. | 395/600 |
| 5,337,155 | 8/1994 | Cornelis | 348/473 |
| 5,339,239 | 8/1994 | Manabe et al. | 364/401 |
| 5,341,477 | * 8/1994 | Pitkin et al. | 395/200.56 |
| 5,343,300 | 8/1994 | Hennig | 348/478 |
| 5,345,594 | 9/1994 | Tsuda | 455/18 |
| 5,347,632 | 9/1994 | Filepp et al. | 395/200 |
| 5,353,218 | 10/1994 | De Lapa et al. | 364/401 |
| 5,355,490 | 10/1994 | Kou | 395/700 |
| 5,357,276 | 10/1994 | Banker et al. | 348/7 |
| 5,361,393 | 11/1994 | Rossillo | 395/650 |
| 5,379,383 | 1/1995 | Yunoki | 395/325 |
| 5,379,421 | 1/1995 | Palazzi, III et al. | 395/600 |
| 5,404,505 | 4/1995 | Levinson | 395/600 |
| 5,414,773 | 5/1995 | Handelman | 380/49 |
| 5,426,427 | 6/1995 | Chinnock et al. | 340/827 |
| 5,426,594 | 6/1995 | Wright et al. | 364/514 |
| 5,428,606 | 6/1995 | Moskowitz | 370/60 |
| 5,434,978 | 7/1995 | Dockter et al. | 395/200 |
| 5,438,355 | 8/1995 | Palmer | 348/1 |
| 5,442,749 | * 8/1995 | Northcutt et al. | 395/200.49 |
| 5,442,771 | 8/1995 | Filepp et al. | 395/650 |
| 5,446,919 | 8/1995 | Wilkins | 455/6.2 |
| 5,448,262 | 9/1995 | Lee et al. | 345/212 |
| 5,465,401 | 11/1995 | Thompson | 455/89 |
| 5,471,629 | 11/1995 | Risch | 395/800 |
| 5,473,143 | 12/1995 | Vak et al. | 235/380 |
| 5,475,740 | 12/1995 | Biggs, Jr. et al. | 379/91 |
| 5,479,472 | 12/1995 | Campana, Jr. et al. | 379/58 |
| 5,483,466 | 1/1996 | Kawahara et al. | 364/514 C |
| 5,485,370 | 1/1996 | Moss et al. | 364/408 |
| 5,491,820 | * 2/1996 | Belove et al. | 707/3 |
| 5,493,677 | 2/1996 | Balogh et al. | 395/600 |
| 5,498,003 | 3/1996 | Gechter | 273/434 |
| 5,511,160 | 4/1996 | Robson | 395/162 |
| 5,512,935 | 4/1996 | Majeti et al. | 348/9 |
| 5,515,098 | 5/1996 | Carles | 348/8 |
| 5,517,605 | 5/1996 | Wolf | 395/155 |
| 5,524,146 | 6/1996 | Morrisey et al. | 379/207 |
| 5,528,490 | 6/1996 | Hill | 364/403 |
| 5,546,541 | * 8/1996 | Drew et al. | 709/104 |
| 5,557,721 | 9/1996 | Fite | 395/148 |
| 5,559,868 | 9/1996 | Blonder | 379/96 |
| 5,577,266 | 11/1996 | Takahisa et al. | 455/66 |
| 5,579,471 | 11/1996 | Barber et al. | 395/326 |
| 5,579,537 | 11/1996 | Takahisa | 455/66 |
| 5,583,563 | 12/1996 | Wanderscheid | 348/13 |
| 5,584,025 | 12/1996 | Keithley et al. | 395/615 |
| 5,600,366 | 2/1997 | Schulman | 348/9 |
| 5,603,029 | * 2/1997 | Aman et al. | 395/675 |
| 5,604,542 | 2/1997 | Dedrick | 348/552 |
| 5,614,940 | 3/1997 | Cobbley et al. | 348/7 |
| 5,617,565 | 4/1997 | Augenbraun et al. | 395/604 |
| 5,638,494 | * 6/1997 | Pinard et al. | 709/202 |
| 5,706,442 | * 1/1998 | Anderson et al. | 705/27 |
| 5,748,190 | 5/1998 | Kjorsvik | 345/329 |
| 5,752,246 | * 5/1998 | Rogers et al. | 707/1 |
| 5,768,528 | 6/1998 | Stumm | 395/200.61 |
| 5,774,660 | * 6/1998 | Brendel et al. | 395/200.31 |
| 5,774,668 | * 6/1998 | Choquier et al. | 709/105 |
| 5,809,242 | 9/1998 | Shaw et al. | 395/200 |
| 5,819,284 | 10/1998 | Farber et al. | 707/104 |
| 5,978,577 | * 11/1999 | Rierden et al. | 707/10 |
| 6,012,083 | * 1/2000 | Savitzky et al. | 709/202 |

6,018,772 * 1/2000 Kamalski ............................ 709/236

OTHER PUBLICATIONS

Article, "Specification Of Basic Encoding Rules For Abstract Syntax Notation One", Fascicle VIII.4–Rec. X.209, Melbourne, 1988, pp131–151.

U. Bensch, "VPV–Video Text Programs Videorecorder", The Phillips Group of Companies, Eindhoven, The Netherlands, Jun. 10, 1988 pp1–5.

F. Schmuck, "ISIS Release", V2.0, May 1990, pp 1–12.

"View Data", The British Library, Chapter 10, Science Reference Library, pp 111–123.

"IBM Technical Disclosure Bulletin", IBM Corporation, Patent Library vol. 28, No. 5 Oct. 1985, pp 2160–2161.

J. Gacael, "The Architecture of Videotex Systems", 1983, pp174–177, pp 233–238.

F. Schneider, "United States District Court Northern District of New York", Rue Walsh & Miller, Attorney's at Law. Nov. 11, 1993.

Professional Group E14 (Television and Sound), Broadcast and Wired Teletext Systems–Ceefax, Oracle, Viewdata, Jan. 13, 1976, pp 2–7.

"Specification of Abstract Syntax Notation One", Fascicle VIII.4–Rec.X.208, Melbourne, 1988, pp 57–130.

K. P. Birman et. at., "ISIS Documentation: Release 1", Jul. 1987, pp 1–89.

K. Birman, et al., "The ISIS System Manual", By The ISIS Project, Jun. 15, 1988, pp1–291.

Brian Proffit, "Intercast Brings the Web to TV", PC Tech/Internet Tools, Jan. 21, 1997, pp203–204.

Patrick McKenna, "COMDEX–Moon Valley's NetCruiser CD and more", Newsbytes, Nov. 16, 1994, Copyright Newsbytes, Inc. 1994.

Berkely Systems, Inc. Article, "More After Dark for Macintosh", Vol. 1, pp 1–13, 1991.

Ped Software Corporation, "Journalist For A Window on a new World Of News", 1994, pp 1–4.

Diaz et al., Rule Management in Object Oriented Databases: A Uniform Approach Barcelona, Spain, Sep. 1991, pp 317–326.

"Monitoring Corporate Information With FirstFloor Products", World Wide Web, Nov. 30, 1996.

Risch, T., "Monitoring Database Objects", Amsterdam 1989, pp 444–453.

McKenzie G.A., " Oracle–An Information Broadcasting Service Using Data Transmission in the Verticle Interval", Journal of the SMPTE vol. 83, Jan. 1974, pp 5–10.

Schroeder et al., "Experience with Grapevine: The Growth of a Distributed System", ACM Transactions on Computer Systems, vol. 2, No. 1, Feb. 1984, pp 3–23.

Roizen, J., Teletext in the USA, SMPTE Journal, vol. 90, No. 7, Jul. 1981, pp 602–610.

James, A., "Oracle–Broadcasting the Written Word", Wireless World, vol. 79, No. 1453, Jul. 1973, pp 314–316.

Phillips, R., Mediaview: "A General Multimedia Digital Publication System", Communications of the ACM, Jul. 1991, vol. 34, No. 7, pp 75–83.

Forsdick et al., "Initial Experience with Multimedia Documents in Diamond", 1984, pp 99–113.

Birman et al., "Exploiting Virtual Synchrony in Distributed Systems", Operating Systems Principles, 1997, pp 123–138.

Bulterman et al., A Structure for Transportable, Dynamic Multimedia Documents, USENIX, 1991, pp 137–155.

InterTect, Ltd., "Health & Science News", Hyper Texxt Newzz, 1996.

Kass, A., "An Interchange Standard and System for Browsing Digital Documents", 1995, pp 1–105.

Avalos, G., "PointCast to team with Microsoft, add new Net dimension", Contra Costa Times, Dec. 12, 1996, pp 1C, 5 C.

Bank, D., "Microsoft Picks On–Line News From PointCast", The Wall Street Journal, Marketplace, Dec. 12, 1996.

"Microsoft to Expand Its Internet Reach", Los Angeles Times, Dec. 12, 1996.

Postel et al., "The ISI Experimental Multimedia Mail System", ISI Research Report, Sep. 1986, pp1–27.

Huang et al., "Multimedia E–mail: the Evolution Approach Based on Adapters", Feb. 1994, pp 785–800.

Phillips, R., "An Interpersonal Multimedia Visualization System", IEEE Computer Graphics & Applications, May 1991, pp 20–27.

Srinivas Ramanathan et al., "Architectures for Personalized Multimedia", IEEE Multimedia, Spring 1994, pp 37–46.

Dunkin, A., "PC Meets TV: The Plot Thickens", Personal Business Week, Dec. 23, 1996, pp 94–95.

Dieberger, A., "Browsing the WWW by interacting with a textual virtual environment—A framework for experimenting with navigational metaphors", 1996, pp 170–179.

Ramanathan et al., "Towards personalized multimedia dial–up services", Computer Networks and ISDN Systems, 1994, pp1305–1322.

Borenstein, N., Multimedia Electronic Mail: "Will the Dream become a reality?" Communications of the ACM, Apr. 1991, vol. 34, No. 4, pp 117–119.

Zuckerman L., "Pushing the Envelope on Delivery of Customized Internet", New York Times, Dec. 9, 1996, pp D5.

Yan et al., "Sift– A Tool for Wide–Area Information dissemination" Unenix Technical conference, Jan. 16–20, 1995–New Orleans, LA, pp 177–186.

Story et al., "The Right Pages Image–Based Electronic Library for Alerting and Browsing", AT&T Bell Laboratories, Sep. 1992, pp 17–25.

Mitchell, G., "Two Free Programs Deliver News to Your PC", PC World, Aug. 1996, pp 76.

Corel Draw Users Manual–Version 4.0, pp 1–475, Corel Corporation, 1993.

"A Need–To–Know Basis", Web–master, Oct. 1996.

"Microsoft Cuts deals with 2 firms", San Jose Mercury News, Dec. 12, 1996.

"Microsoft Unites With Pointcast at Trade Show", San Francisco Chronicle, Dec. 12, 1996.

"Microsoft and Pointcast in Broadcast Alliance", The New York Times, Dec. 12, 1996.

"Big Business at Businesswire.Com", INSITE, Web Techniques, Christopher Elliott, pp 95–99, Dec. 1996.

"Microsoft teams with Pointcast", The Globe and Mail, Dec. 12, 1996.

Prodigy article, Prodigy Services Company 1989, pp1–6.

Patent Abstracts of Japan, "European Patent Office", Abstract date Apr. 12, 1991, Application JP900000018.

"Journalist", "Your Personalized Newspaper for CompServe", Ped Software Corporation, 1993, pp 1–143.

Lamont, L., "Synchronization of Multimedia Data for a Multimedia News–on–Demand Application", IEEE Journal on Selected Areas in communications, vol. 14, No. 1, Jan. 1996, pp 264–278.

Baer, R., "Tele–Briefs a Novel User–Selectable Real Time News Headline Service for Cable TV", IEEE Transactions on Consumer Electronics, vol. CE–25, No. 3, Jul. 1979, pp 406–408.

Frook, J., "News to the Desktop", Interactive Age, Apr. 29, 1996, pp IA1, 1A8.

Hoffert, E. et al., The Digital News System at EDUCOM: A Convergence of Interactive Computing, Newspapers, Television and High–Speed Networks, Communications of the ACM, Apr. 1991/vol. 34, No. 4, pp 113–116.

"PointCast Network", Netguide, www.netguidemag.com, Sep. 1996, pp 121.

Karen Rodriguez, "Individual to tap Internet with an agent–based news service", Info World, Oct. 24, 1994, vol. 16, No. 43, 1994, pp 58.

Patent Abstracts of Japan, "European Patent Office", Patent date Aug. 11, 1994, Application JP930124730.

Rebecca Rohan, "In Your Face makes you a star–okay, a screen saver", Computer Shopper, May 1994, vol. 14, No. 5, pp 767, Copyright Coastal Associates Publishing LP 1994.

Patent Abstracts of Japan, "European Patent Office", Abstract date Jan. 20, 1993, Application JP910000887.

Singh, A., "News Servers", PC Magazine, Jan. 21, 1997.

Thimm, H., "A Multimedia Enhanced CSCW Teleservice for Wide Area Cooperative Authoring of Multimedia Documents", SIGOIS Bulletin, Dec. 1994/vol. 15, No. 2, pp 49–57.

Jackson, S. et al., "InterMail: A Prototype Hypermedia Mail System", Dec. 1991, pp 405–409.

Miller, G. et al., "News On–Demand for Multimedia Networks", 1993, pp 383–392.

Daniel Grotta, et al., "PhotoGenix creates screen–saver slide shows", PC Magazine vol. 13, No. 16, pp 52, Sep. 27, 1994, Copyright Ziff–Davis Publishing Company 1994.

Barrie, J., et al., "The World Wide Web As An Instructional Tool", Science/vol. 274, Oct. 1996, pp 371–372.

Berst, J., "'Push' Products Redefine Internet", PC Week, Nov. 25, 1996, pp 63.

Overton, R., "PointCast 1.1: More Content for News Junkies", PC World, Jan. 1997, pp 102.

Nauchno–Tekh, article , "An Adaptation Method for SDI", Nauchno–Teknicheskaya Informatsiya Seriya 2, 1973, USSR, pp 25–27.

Simba Information, Inc., "PED Delivers Personalized Newspapers To Users Desktops", Electronic Information Report, Apr. 15, 1994, vol. 15, No. 14.

O'Connell, G.M., article, "Turning on to screen Savers", Jun. 1994, pp 97.

Journal Article, "Innovation That Has a Purpose Is Called Key to Tehnology Success Anonymous", Marketing News vol. 22, No. 6, Mar. 14, 1988, pp 37, 40.

Inglesby, T., Journal Article, "Manufacturing Systems Supplement", Oct. 1992, pp 6–10.

Quain, J., "Journalist Delivers Your Own Personalized Newspaper", PC Magazine, vol. 12, No. 17, Oct. 12, 1993, pp 49.

Flynn, M. et al., "The Daily Me: Laying Out Tomorrow's (electronic) News", PC Magazine, vol. 12, No. 15, Sep. 14, 1993, pp 29.

Texline Global News, Home Computer–From Your own Correspondent, Sep. 24, 1993, pp 15.

Business & Industry, "Journalist–A New Podigy Add On", Newsbytes News Network, Apr. 5, 1994.

Peake, S. et al., "New Custom File Capability For Nexis", Dateline: Dayton, OH., May 1, 1985.

Abrahms, D., "Patent Office May Hinder Hopping Of bunny Across Computerscreens", The Wahington Times, Business Section, Apr. 16, 1997, pp B7.

Williams, M., Article, "Oracle's Vision of Networked Future", Geneva, Switzerland, Oct. 5, 1995.

Article, "And Now The News– On Your PC Screen", Broadcast Newsbytes News Network, Kanata, Ontario, Canada, Oct. 16, 1995.

Article, "Globe Information To Market NewsEdge In Canada", Newsbytes News Network, Toronto, Ontario, Canada, May 26, 1992.

David Morgenstern, "Farcast service broadcasts instant info via the Internet; database use "droids" to process new items", PC Week, Aug. 29, 1994, vol. 11, No. 34, pp 50, 1994.

Barbara Krasnoff, "Microsoft Scenes screen savers bring culture to your desktop (various natural and artistic wonders depicted as screen images)", Computer Shopper, Feb. 1994, vol. 14, No. 2, pp 508, Copyright Coastal Associates Publishing LP 1994.

* cited by examiner

300 — Private Corporate Agent:

| Category ID | Category Description |
|---|---|
| 66816 | Corporate Data Channel |
| 67072 | Corporate Data Channel News Flash |

310 — AdStats Agent:

| Category ID | Category Description |
|---|---|
| 66080 | Upload/Stats |
| 66081 | Upload/Stats: Encoded |
| 66082 | Upload/Stats: Encoded and Compressed |
| 66083 | Upload/Stats: Incremental |
| 66084 | Upload/Stats Truncated |

320 — Pass Through Agent:

| Category ID | Category Description |
|---|---|
| 65792 | PCN Registration |
| 66048 | Upload/unknown |
| 66064 | Upload/Registration |
| 66096 | Upload/Profile |
| 66112 | Upload: Miscellaneous |
| 66304 | Authentication |
| 66320 | Authentication: For V1.1 |
| 66336 | Authentication: Full Implementation |
| 66560 | Proxy Server |
| 3277056 | Hot Sites: Configuration |
| 4587776 | Web: Configuration |

330 — Redirection Agent:

| | |
|---|---|
| 66560 | Proxy Server |

340 — Administration Agent:

| | |
|---|---|
| 64904 | Empty Cache |

Fig. 3A

350 —— Proxy Cache Agent:

| Category ID | Category Description |
|---|---|
| 655616 | News: National |
| 655632 | News: National Summary |
| 655872 | News: International |
| 655888 | News: International Summary |
| 656128 | News: Political |
| 656144 | News: Political Summary |
| 1310976 | Finance: Historic Quotes |
| 1311232 | Finance: Current Quotes |
| 1311488 | Finance: Articles |
| 1966336 | Weather: Maps |
| 1966592 | Weather: Forecast Cities |
| 2621696 | Sports: General News |
| 2621712 | Sports: News Summary |
| 2621952 | Sports: ML Baseball News |
| 2621968 | Sports: ML Baseball Summary |
| 2622208 | Sports: NBA Basketball News |
| 2622224 | Sports: NBA Basketball Summary |
| 2622464 | Sports: M_Coll. Basketball News |
| 2622480 | Sports: M_Coll. Basketball Summary |
| 2622720 | Sports: W_Coll. Basketball News |
| 2622736 | Sports: W_Coll. Basketball Summary |
| 2622976 | Sports: NFL Football News |

Ⓐ

| Category ID | Category Description |
|---|---|
| 2626160 | Olympics: Team Standings |
| 2626176 | Olympics: Team Results |
| 2626192 | Olympics: Event Results |
| 2633728 | Sports: Ticker |
| 5898560 | Entertainment: News Summary |
| 3932416 | Version Control: Software |
| 3932432 | Version Control: Ad Pool |
| 3932448 | Version Control: Screen Saver |
| 3997952 | Shadow Version Control: Software |
| 3997968 | Shadow Version Control: Ad Pool |
| 3997984 | Shadow Version Control: Screen Saver |
| 5243136 | Business: General News |
| 5243152 | Business: News Summary |
| 5243392 | Business: Industry News |
| 5898512 | Entertainment: Variety Advisories |
| 5898528 | Entertainment: Variety News |
| 5898544 | Entertainment: Variety Business |
| 5898752 | Entertainment: Horoscopes |
| 5899008 | Entertainment: Lottery |
| 13107200 | LA Times: Front Page |
| 13107456 | LA Times: Nation/World |
| 13107712 | LA Times: State/Local |
| 13107968 | LA Times: Sports |

| | |
|---|---|
| 2622992 | Sports: NFL Football Summary |
| 2623232 | Sports: CFL Football News |
| 2623248 | Sports: CFL Football Summary |
| 2623488 | Sports: College Football |
| 2623504 | Sports: College Football Summary |
| 2623744 | Sports: General News |
| 2623760 | Sports: General Summary |
| 2625536 | Sports: Golf and Tennis News |
| 2625552 | Sports: Golf and Tennis Summary |
| 2625792 | Sports: NHL Hockey News |
| 2625808 | Sports: NHL Hockey Summary |
| 2626048 | Sports: Olympic News |
| 2626064 | Olympics: Main Lead |
| 2626080 | Olympics: Medals Tally |
| 2626096 | Olympics: Results Ticker |
| 2626112 | Olympics: Daily Schedule |
| 2626128 | Olympics: Features |
| 2626144 | Olympics: Daily Roundups |

B

| | |
|---|---|
| 13108224 | LA Times: Business/Technology |
| 13108480 | LA Times: Life/Style |
| 13108736 | LA Times: Calendar |
| 13108992 | LA Times: Commentary |
| 13109264 | LA Times: Daily Photo |
| 13238272 | Boston Globe: Nation/World |
| 13238528 | Boston Globe: Metro/Region |
| 13238784 | Boston Globe: Editorials |
| 13239040 | Boston Globe: Business |
| 13239296 | Boston Globe: Living Arts |
| 13239552 | Boston Globe: Sports |
| 13239808 | Boston Globe: Page One |
| 13369344 | Time Warner: Money |
| 13369360 | Time Warner: Money Photo |
| 13369600 | Time Warner: People |
| 13369616 | Time Warner: People Photo |
| 13369856 | Time Warner: Time |
| 13369872 | Time Warner: Time Photo |

1) /FIDO-1/<categoryID>-<LastID>
2) /FIDO-1/NumItm-<number-requested>/<categoryID>-<LastID>/<search-argument>
3) /FIDO-1/NumRef-<number-requested>/<categoryID>-<LastID>/<search-argument>
4) /FIDO-1/<categoryID>-<LastID>/<search-argument>

FORMAT OF 0.DC FILE

700 — [name of destination computer]
720 — EnableCorpChannel= $X^1$
720 — Name= $X^2$
730 — UsageMode= $X^3$
         Address1=$X^4$
         Name1= $X^5$
         ...
740 — AdressX= $X^4$
         NameX= $X^5$ $^1$X=1 for yes, 0 for no.
$^2$X=name of originator of this file.
$^3$X=1 to indicate to the client to randomly select from the following list of address, below. 2 to indicate selection from the following list sequential order.
$^4$X=IP address of caching-proxy-server-Lport1....portN.
$^5$X=name of caching-proxy-server.

Fig. 7

```
900  ── NAME=channel_name
910  ── SS_LOGO=logo for SmartScreen
920  ── AD_LOGO=logo for advertisement
930  ── SS_FILE=chosen SmartScreen for this channel
940  ── FLASH_FILE=file that contains the messages
        that scrool across the ticker tape ;Group #1
950  ── GROUP=group_name1
960  ── DOC_SUBJECT=subject1_1
970  ── DOC_ID=docID1_1
980  ── DOC_SUMMARY=html document1_1
990  ── DOC_SUMMARY_END
     DOC_SUBJECT=subject1_2
     DOC_SUMMARY=html document1_2
     DOC_SUMMARY_END

...

; Group#N
     GROUP=group_nameN
     DOC_SUBJECT=subjectN_1
     DOC_ID=docIDN_1
     DOC_SUMMARY=html documentN_1
     DOC_SUMMARY_END ...
     DOC_SUBJECT=subjectN_M
     DOC_ID=docIDN_M
     DOC_SUMMARY=html documentN_M
     DOC_SUMMARY_END
```

Fig. 8

| | Daily Active: | | 400,00 | | | 200,000 | | | 50,000 | |
|---|---|---|---|---|---|---|---|---|---|---|
| | Daily High Req/Soc | | 2000 | | | 1000 | | | 250 | |
| | No. of Peervers Required | | 31 | | | 15 | | | 4 | |
| | Peak Internet Traffic (Mbps) No Compression | | 190 | | | 95 | | | 24 | |
| | Peak Internet Traffic (Mbps) Compression | | 133 | | | 67 | | | 17 | |
| | Compression Efficiency (Phase-In) | | 30% | | | 30% | | | 30% | |
| | Data Server (Alpha4100) | | 3 | | | 2 | | | 0 | |
| | Cabinets (Racks) | | 6 | | | 6 | | | 4 | |
| | | | Initial Cost | | | Initial Cost | | | Initial Cost | |
| | Servers | | $ 816,654 | | | $ 493,577 | | | $ 251,269 | |
| | Network Equipments | | $ 337,733 | | | $ 195,763 | | | $ 89,284 | |
| | Internet Connections | | $ 33,250 | | | $ 16,625 | | | $ 4,156 | |
| | Total Capital Cost | | $ 1,187,637 | | | $ 705,964 | | | $ 344,710 | |
| Servers | Description | Qty | $/ea | Total | Qty | | Total | Qty | | Total |
| Point Servers | PentiumPro 2 | 31 | $ 8,000 | $ 246,154 | 15 | | $ 123,077 | 4 | | $ 30,769 |
| Point Routers | PentiumPro 2 | 2 | $ 7,000 | $ 14,000 | 2 | | $ 14,000 | 2 | | $ 14,000 |
| Feed Serves | Pentium 166M | 5 | $ 4,500 | $ 22,500 | 5 | | $ 22,500 | 5 | | $ 22,500 |
| Mgmt Servers | Pentim 166M | 4 | $ 4,000 | $ 18,000 | 4 | | $ 18,000 | 4 | | $ 18,000 |
| Data Servers | Alpha4100-1g | 3 | $ 130,000 | $ 400,000 | 2 | | $ 200,000 | 0 | | $ 50,000 |
| Spare Servers | Pentium Pro 2 | 2 | $ 8,000 | $ 16,000 | 2 | | $ 16,000 | 2 | | $ 16,000 |
| Oracle Lincense | For primary da | 1 | $ 100,000 | $ 100,000 | 1 | | $ 100,000 | 1 | | $ 100,000 |
| | sub-total | | | $ 816,654 | | | $ 493,577 | | | $ 251,269 |

Fig. 17A

| Network Eq | Description | Qty | $/ea | Total | Qty | | Qty | |
|---|---|---|---|---|---|---|---|---|
| Router | 7507-1 HSSI | 2 | $ 80,000 | $ 177,333 | 1 | $ 88,667 | 0 | $ 22,167 |
| CSU/DSU | Digital Link | 3 | $ 7,000 | $ 23,275 | 2 | $ 11,638 | 0 | $ 2,909 |
| Switch Hub | Catalyst 5000 | 2 | $ 25,000 | $ 43,510 | 1 | $ 27,484 | 1 | $ 15,465 |
| | Catalyst 5000 | 3 | $ 20,000 | $ 69,615 | 2 | $ 43,974 | 1 | $ 24,744 |
| Firewall | SunScreen | 1 | $ 22,000 | $ 22,000 | 1 | $ 22,000 | 1 | $ 22,000 |
| Misc | cables,etc | 1 | $ 2,000 | $ 2,000 | 1 | $ 2,000 | | $ 2,000 |
| | sub-total | | | $ 337,733 | | $ 195,763 | | $ 89,284 |
| Internet Co | Description | Qty | $/ea | Total | Qty | | Qty | |
| DS3 | 45Mbps conne | 3 | $ 10,000 | $ 33,250 | 2 | $ 16,625 | 0 | $ 4,156 |
| | | | | $ 33,250 | | $ 16,625 | | $ 4,156 |

Fig. 17B

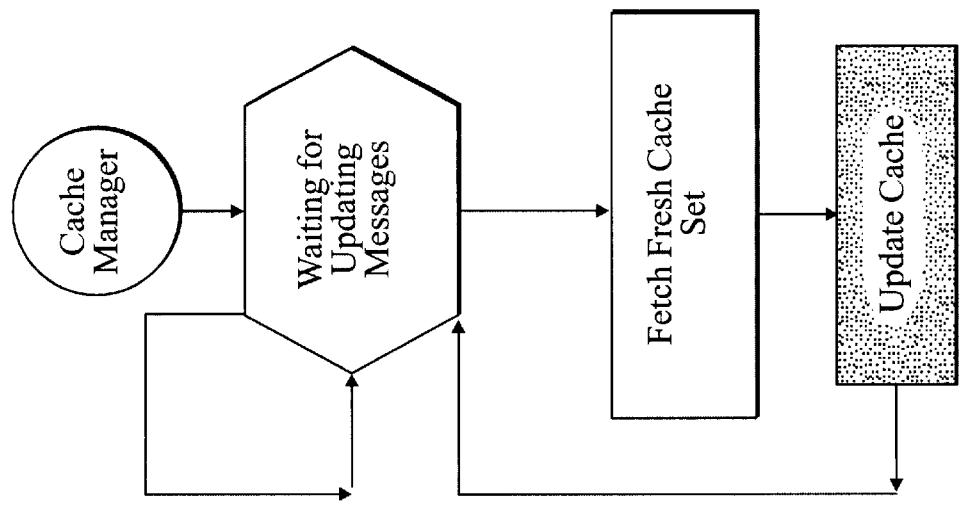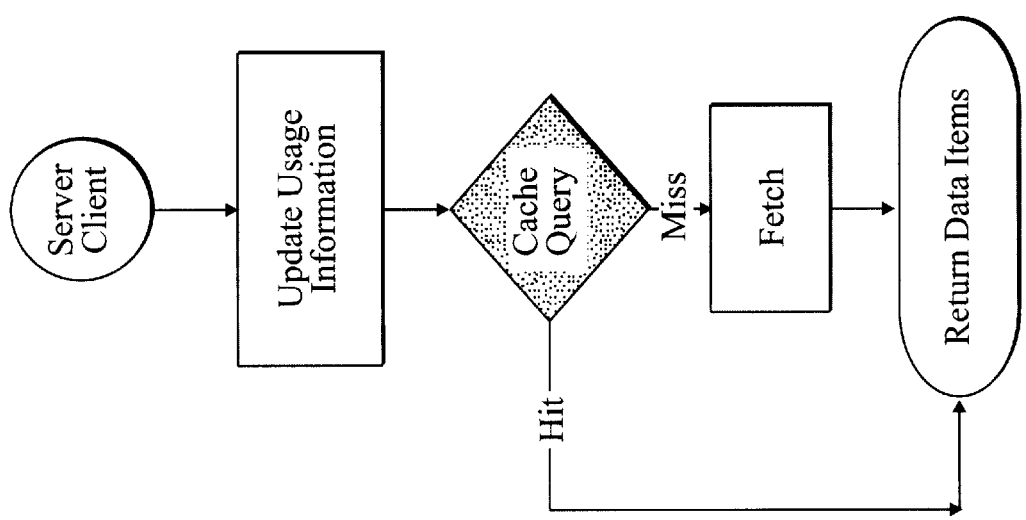
Fig. 20

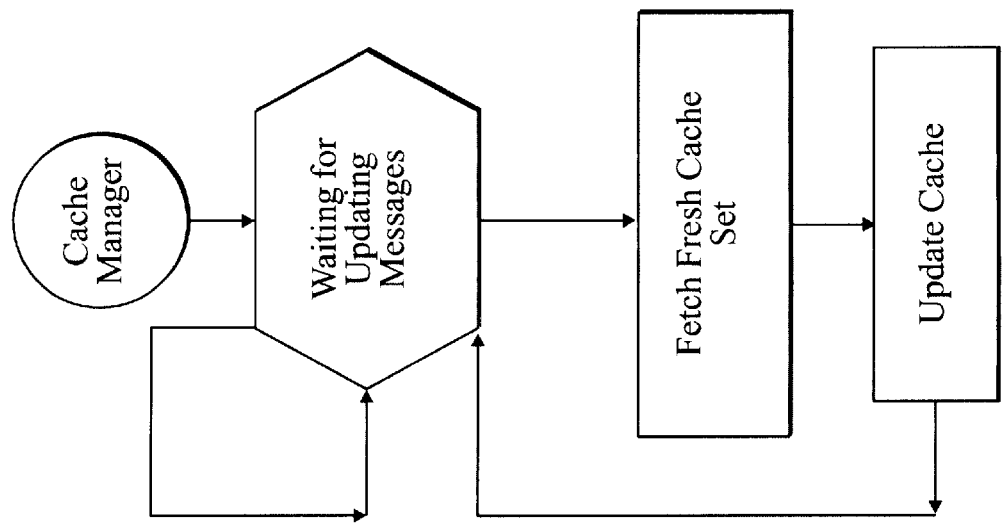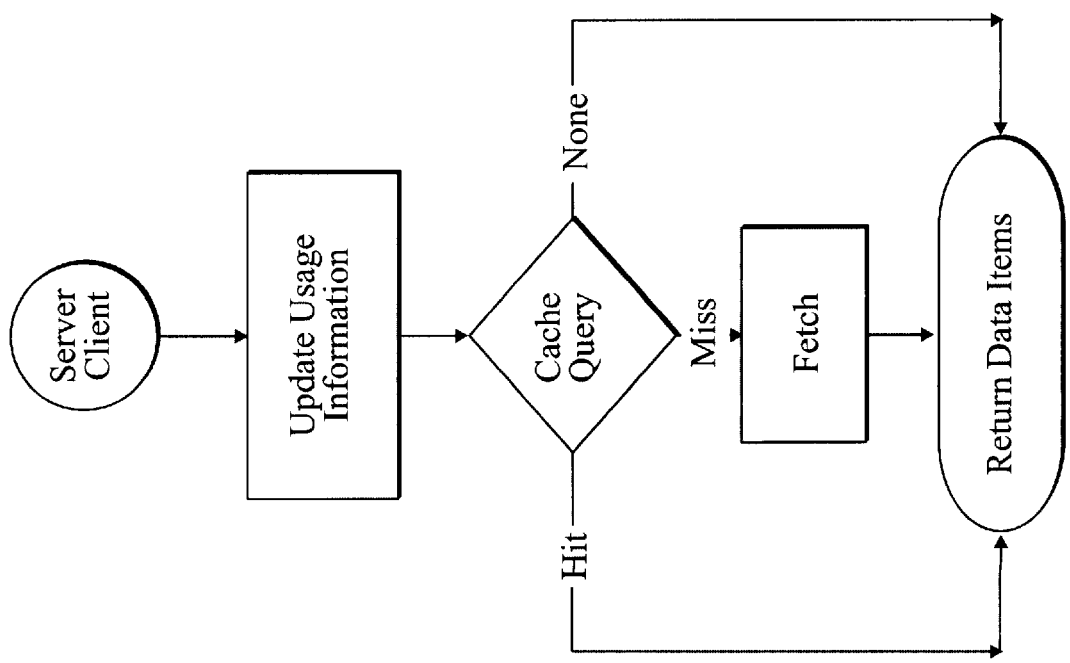
Fig. 21

APPARATUS, METHOD AND ARTICLE OF MANUFACTURE FOR SERVICING CLIENT REQUESTS ON A NETWORK

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention generally relates to improvements in computer systems, and more specifically, to improved servicing of client requests on a network.

BACKGROUND OF THE INVENTION

An internet is a group of networks and individual computers communicating via a common protocol. The Internet is a world-wide "network of networks" that use the TCP/IP (Transmission Control Protocol/Internet Protocol) protocol suite for communications. TCP/IP is a set of protocols and programs used to interconnect computer networks and to route traffic among different types of computers. These protocols describe allowable data formats, error handling, message passing, and communication standards. Computer systems that use TCP/IP speak a common language, regardless of hardware or operating system differences.

Part of the popularity of the TCP/IP protocol suite is due to its ability to be implemented on top of a variety of communications channels and lower-level protocols such as T1 and X.25, Ethernet, and RS-232-controlled serial lines. Most sites use Ethernet connections at local area networks to connect hosts and client systems, and then connect that network via a T1 line to a regional network (i.e., a regional TCP/IP backbone) that connects to other organizational networks and backbones. Sites customarily have one connection to the Internet, but large sites often have two or more connections. Modem speeds are increasing as new communications standards are being approved, thus versions of TCP/IP that operate over the switched telephone network are becoming more popular. Many sites and individuals use PPP (Point-to-Point Protocol) and SLIP (Serial Line IP), to connect networks and workstations to other networks using the switched telephone network.

Many large networks conform to these protocols, including the Internet. Thousands of computers at universities, government agencies, and corporations are connected to a network that follows the TCP/IP protocols. Any machine on the Internet can communicate with any other. Machines on the Internet are referred to as hosts or nodes and are defined by their Internet (or IP) address.

The Internet was created initially to help foster communication among government-sponsored researchers. Throughout the 1980's, the Internet grew steadily to include educational institutions, government agencies, commercial organizations, and international organizations. In the 1990's, the Internet has undergone phenomenal growth, with connections increasing faster than any other network ever created (including the telephone network). Many millions of users are now connected to the Internet, with roughly half being business users. The Internet is being used as the basis for the National Information Infrastructure (NII).

Many organizations are in the process of connecting to the Internet to take advantage of Internet services and resources. Businesses and agencies are now using the Internet or considering Internet access for a variety of purposes, including exchanging e-mail, distributing agency information to the public, and conducting research. Many organizations are connecting their existing internal local area networks to the Internet so that local area network workstations can have direct access to Internet services.

Internet connectivity can offer enormous advantages, however security needs to be a major consideration when planning an Internet connection. There are significant security risks associated with the Internet that often are not obvious to new (and existing) users. In particular, intruder activity, as well as vulnerabilities that could assist intruder activity, are widespread. Intruder activity is difficult to predict and at times can be difficult to discover and correct. Many organizations already have lost productive time and money in dealing with intruder activity; some organizations have had their reputations suffer as a result of intruder activity at their sites being publicized.

A firewall system is one technique that has proven highly effective for improving the overall level of site security. A firewall system is a collection of systems and routers logically placed at a site's central connection to a network. A firewall system can be a router, a personal computer, a host, or a collection of hosts, set up specifically to shield a site or intranet from protocols and services that can be abused from hosts outside the intranet. A firewall system is usually located at a higher-level gateway, such as a site's connection to the Internet; however, firewall systems can be located at lower-level gateways to provide protection for some smaller collection of hosts or intranets. A firewall forces all network connections to pass through the gateway, where they can be examined and evaluated, and provides other services such as advanced authentication measures to replace simple passwords. The firewall may then restrict access to or from selected systems, or block certain services, or provide other security features. The main purpose of a firewall system is to control access to or from a protected network (i.e., a site). It implements a network access policy by forcing connections to pass through the firewall, where they can be examined and evaluated.

The general reasoning behind firewall usage is that, without a firewall, an intranet's systems expose themselves to inherently insecure services and to probes and attacks from hosts elsewhere on the network. A firewall provides numerous advantages to sites by helping to increase protection from vulnerable services, controlled access to site systems, concentrated security, enhanced privacy, logging and statistics on network use, and misuse policy enforcement. In a firewall-less environment, network security relies totally on host security and all hosts must, in a sense, cooperate to achieve a uniformly high level of security. The larger the intranet, the less manageable it is to maintain all hosts at the same level of security. As mistakes and lapses in security become more common, break-ins occur, not as the result of complex attacks, but because of simple errors in configuration and inadequate passwords.

A firewall provides the means for implementing and enforcing a network access policy. In effect, a firewall provides access control to users and services. Thus, a network access policy can be enforced by a firewall. One problem is that Intranets that have a significant number of clients deployed often overwhelm the throughput capacity of the firewall.

A proxy server in general is a process that provides a cache of items available on other servers which are presumably slower or more expensive to access.

More specifically, a caching proxy server is used for a World-Wide Web server which accepts uniform resource locators (URLs) with a particular prefix. When it receives a request for such a URL, it strips off the prefix and looks for the resulting URL in its local cache. If found, it returns the document immediately, otherwise it fetches it from the remote server on the Internet, saves a copy in the cache and returns it to the requester. The cache will usually have an expiry algorithm which flushes documents according to their age, size, and access history. Caching proxy servers are often implemented to alleviate the problem of firewalls or proxy gateway servers that are overwhelmed by requests.

In comparison, a proxy gateway server is a computer and associated software which will pass on a request for a URL from a Internet browser to an outside server and return the results. This provides clients on Intranets a trusted agent that can access the Internet on their behalf. The proxy gateway is transparent to the client. A proxy gateway is a server that simply forwards requests from clients or other proxies on to another server or proxy. The second server or proxy sees the original proxy as just another HTTP client. When the proxy receives a response to the forwarded request, it simply returns it to the client. An Internet gateway proxy services HTTP requests by translating them into protocols other than HTTP. The reply sent from the remote server to the gateway is likewise translated into HTTP before being forwarded to the user agent.

In HTTP messaging, proxies use the header of the request to indicate the intermediate steps between the user agent and the server (on requests) and between the origin server and the client (on responses). The header is intended to trace transport problems and to avoid request loops.

Furthermore, agents can be implemented on clients or servers which are connected to the Internet. In the client-server model, an agent is the part of the system that performs information preparation and exchange on behalf of a client or server. Especially in the phrase "intelligent agent," it implies an automatic process which can communicate with other agents to perform some collective task on behalf of one or more humans. The term agent is used to describe an automatic computer process that performs an action, such as information preparation or exchange, with no human intervention involved. Examples of Internet agents are brokers, wanderers, spiders, worms and viruses. Agents can facilitate work and coordinate tasks among machines and other agents.

Data is transmitted across the Internet in packets. A packet is a logical grouping of information that includes a header, control information, and a body that usually contains user data. A message may be segmented into a number of packets. When sent from one user to another via the Internet, individual packets may go by different routes and the packets are reassembled into the original message before reaching the destination. This contrasts with circuit switching in which the two users are actually connected by an end-to-end circuit, telephone network. Packet is the common name for a layer 3 PDU (Physical Data Unit: A unit of information at any given level of the 7-layer OSI protocol stack. Layer 3 PDUs are often called packets while layer 3 PDUs are often called frames) IP datagrams are often called packets.

Packets can be intercepted at any point within a packet-based network unless special security measures are in place. Capturing packets in this manner is known as network "snooping," "packet sniffing," and "promiscuous monitoring." Sniffers are either hardware or software devices that can intercept and capture electronic messages not addressed to it, but rather addressed to another address on a network. Sniffers are a network monitoring tool that can capture data packets and decode them to show protocol data.

Sniffers typically have the capability of capturing every packet on a network and of decoding all seven layers of the OSI protocol model; the physical layer, the datalink layer, the network layer, the transport layer, the session layer, the presentation layer, the application layer. Capture frame selection can be based on several different filters such as protocol content at lower levels, node addresses, destination class, and pattern matching.

Network sniffers typically display network traffic information and performance statistics in real time, and in user-selectable formats. Numeric station addresses are translated to symbolic names or manufacturer ID names. Network activities measured include buffer use, frames accepted, and Kbytes accepted. Counters for activities specific to particular networks may be implemented. Network activity is expressed as frames/second, Kbytes/ second, or percentage of network bandwidth utilization. Data collection by a sniffer may be output to printer or stored to disk in either print-file or spread-sheet format.

In addition to the problem of firewalls overwhelmed by requests, distribution of internal communication via an organization's Intranet is often cumbersome and inconvenient to the users of client computers and the administrators of the Intranets.

The Hypertext Transfer Protocol (HTTP) is an application-level protocol for distributed, collaborative, hypermedia information systems. HTTP has been in use by the World-Wide Web since 1990. An HTTP client submits requests to an HTTP server. The server responds by returning a response code and any appropriate data indicated by the original request. HTTP allows an open-ended set of methods that indicate the purpose of a request. A method indicates the operation that the client requests the server to perform. HTTP builds on the discipline of reference provided by the Uniform Resource Identifier (URI), as a location (URL) or name (URN), for indicating the resource to which a method is to be applied. Messages are passed in a format similar to that used by Internet mail as defined by the Multipurpose Internet Mail Extensions (MIME). HTTP is also used as a generic protocol for communication between user agents and proxies/gateways to other Internet systems, including those supported by the SMTP, NNTP, FTP, Gopher, and WAIS protocols. In this way, HTTP allows basic hypermedia access to resources available from diverse applications.

While the set of HTTP methods is open-ended, the HTTP methods GET and HEAD must be supported by all servers that are HTTP-compliant. All other methods are optional. The GET method retrieves information identified by the Request-URI.

The Request-URI is a Uniform Resource Identifier and identifies the resource upon which to apply the request.

Request-URI="*"|absolute URI|abs_path

The three options for Request-URI are dependent on the nature of the request.

(1) The asterisk "*" means that the request does not apply to a particular resource, but to the server itself, and is only allowed when the method used does not necessarily apply to a resource. One example would be

OPTIONS*HTTP/1.1

(2) The absolute URI form is required when the request is being made to a proxy. The proxy is requested to forward the request or service it from a valid cache, and return the response. Note that the proxy may forward the request on to another proxy or directly to the server specified by the absolute URI. In order to avoid request loops, a proxy must be able to recognize all of its server names, including any aliases, local variations, and the numeric IP address. An example Request would be:

GET http://www.w3.org/pub/WWW/TheProject.html HTTP/1.1

All HTTP-compliant servers must accept the absolute URI form in requests, even though HTTP-compliant clients will only generate them in requests to proxies.

(3) The absolute path ("abs_path") of the URI must be transmitted where a resource on an origin server or gateway is identified.

The semantics of the GET method change to a "conditional GET" if the request message includes an If-Modified-Since, If-Unmodified-Since, If-Match, If-None-Match, or If-Range header field as described by IETF publication at http://ds.internic.net/rfc/rfc2068.txt. A conditional GET method requests that data be transferred only under the circumstances described by the conditional header field(s). The conditional GET method is intended to reduce unnecessary network usage by allowing cached entities to be refreshed without requiring multiple requests or transferring data already held by the client.

The above method of specifying GETs is problematic in the complexity of the variations of the GET method.

SUMMARY OF THE INVENTION

The foregoing problems of servicing client requests in an improved manner by a server is facilitated utilizing a combination of sending an identifier (id) of the last article that has been previously sent to the client, load balancing servers to provide efficient servicing of clients and providing redundant servers so that a failure of any one server does not result in the termination of server services to clients.

BRIEF DESCRIPTION OF THE DRAWINGS

The above and further advantages of the invention may be better understood by referring to the following description, in conjunction with the accompanying drawings, in which:

FIGS. 3A and 3B represent tables which show which GET requests of each category id are processed by the six caching proxy agents in accordance with a preferred embodiment;

FIG. 7 illustrates the format of the 0.dc file in accordance with a preferred embodiment;

FIG. 8 illustrates the format of the corp.dat file in accordance with a preferred embodiment;

FIG. 17 is a spreadsheet illustrating various sources of information in accordance with a preferred embodiment;

FIG. 20 is a flow chart setting forth the cache logic simplified by adopting the scheduled cache data refreshing methods in accordance with a preferred embodiment; and FIG. 21 is a flowchart of the proposed URI cache scheme in accordance with a preferred embodiment.

DETAILED DESCRIPTION

Figure 1:
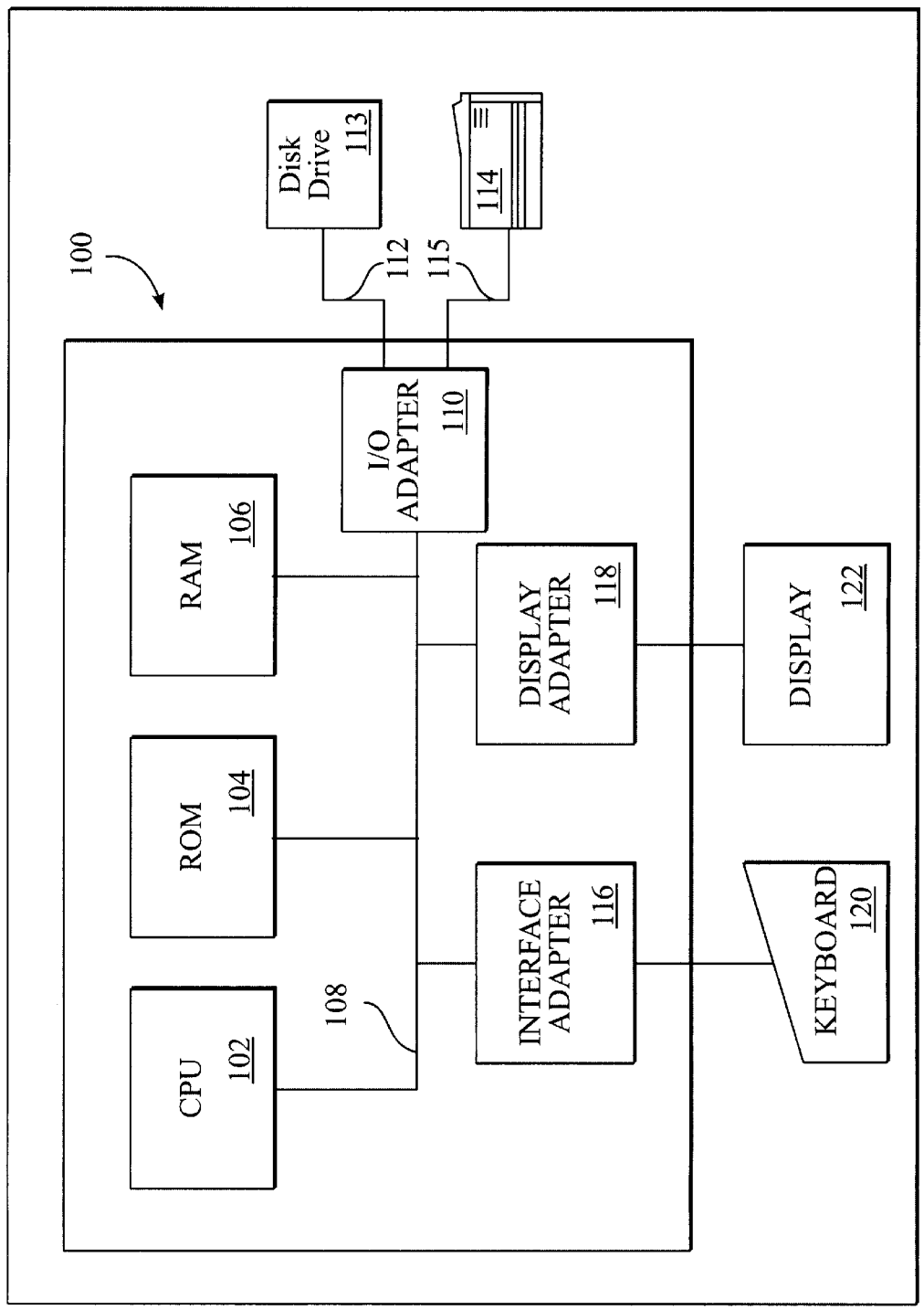
FIG. 1 illustrates a typical hardware configuration of a computer in accordance with the subject invention.

A representative hardware environment is depicted in FIG. 1, whch illustrates a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most server computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands, and an input/output (I/O) adapter 110 for connecting peripheral or network devices, such as a disk unit 113 and printer 114, to the bus 108, via cables 115 or peripheral bus 112, respectively. A user interface adapter 116 is also provided for connecting input devices, such as a keyboard 120, and other known interface devices, including mice, speakers, and microphones to the bus 108. Visual output is provided by a display adapter 118 which connects the bus 108 to a display device 122, such as a video monitor. The computer has resident thereon and is controlled and coordinated by operating system software such as the SUN Solaris, Windows NT, or JavaOS operating system.

Figure 2:
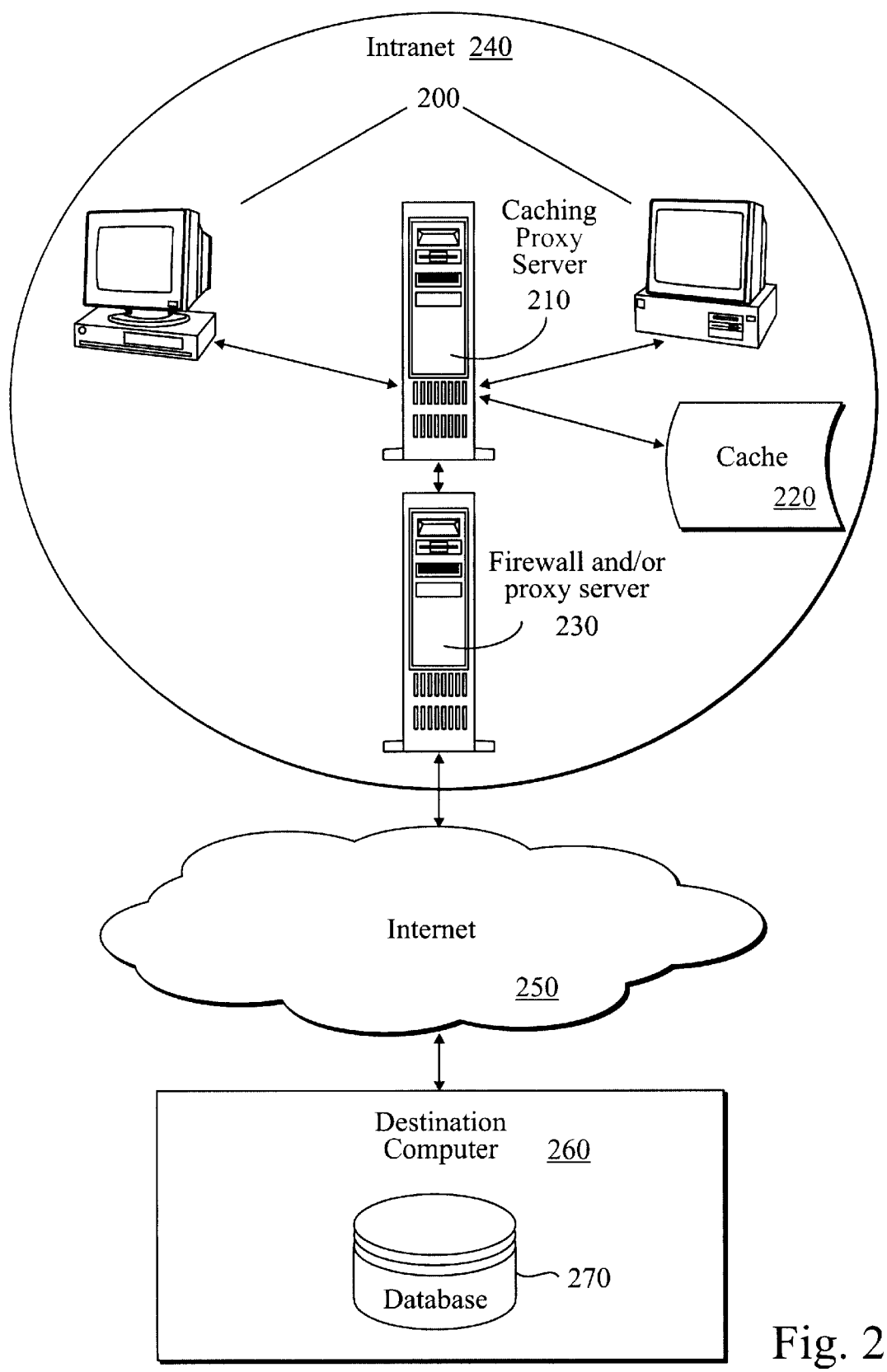
FIG. 2 illustrates the topology of an intranet containing a caching proxy server and firewall connected to the Internet in accordance with a preferred embodiment.

FIG. 2 illustrates the topology of an intranet containing a caching proxy server and firewall connected to the Internet in accordance with a preferred embodiment. Client computers, typically PC-based workstations or UNIX-based workstations 200 communicate to a caching proxy server 210 having a cache of data 220 which communicates to a firewall 230 via a local area network or intranet 240. The intranet 240 communicates to the Internet 250, which communicates to a destination computer 260 having a database 270.

When a caching proxy server 210 having a cache 220 is installed into the intranet 240 and is in operation, a plurality of agents will operate on the caching proxy server 210, a corporate agent, an adstats agent, a proxycache agent, a passthrough agent, and an administration agent. All HTTP GET requests from client computers 200 are served by assigned agents on the caching proxy server 210.

When a caching proxy server 210 having a cache 220 is installed into the intranet 240 and is in operation, this event is received and stored by the destination computer 260. To begin operation of the caching proxy server 210, a "proxy_GET" request is sent to the destination computer 260 having a database 270.

The destination computer 260 transmits a table to the caching proxy server 210 that identifies which caching proxy server agent will serve a GET request. The distinction is based on the category id of the GET request.

FIGS. 3A and 3B represent tables which identify which GET requests of each category id are processed by the six caching proxy agents in accordance with a preferred embodiment. When a GET request is received by the caching proxy server, the category id of the request is examined to determine which agent on the caching proxy server should serve the request. This operation is different than the function of a sniffer because a sniffer examines the protocol content at lower levels, node addresses, destination class. The caching proxy server is examining a different element of the packet, the category id. The caching proxy server is also different from a sniffer in that the caching proxy server intercepts the request and uses the category id to determine which process should server the request, while a sniffer never intercepts the requests.

The Private Corporate Agent 300 serves requests of the Content Server, which private internal communication facility. The AdStats Agent 310 serves requests to pass advertisement statistical information to a destination computer. The PassThrough Agent 320 serves requests that are to be passed through to a destination computer. The Redirection Agent 330 serves all "proxy_GET" requests to redirect subsequent client request to another caching proxy server. The Administration Agent 340 serves all system administrative functions, such as deleting the caching proxy server cache. The ProxyCache Agent 350 serves requests to retrieve specific information from the caching proxy server.

An illustrative embodiment of the invention in a network computing environment is one in which a "Redirection" software agent on a caching proxy server fulfills "proxy_GET" requests from a client by transmitting a list of proxy server(s) within the Intranet of the client that will serve the client, a "Proxycache" agent that will fulfill HTTP GET client requests by either retrieving cached data or passing the request to a "Passthrough" agent that will pass the client request through to the destination server, an "Administration" agent that will process administrative requests from clients, and a "Corporate" agent that will store and distribute internal organization information.

Figure 4:
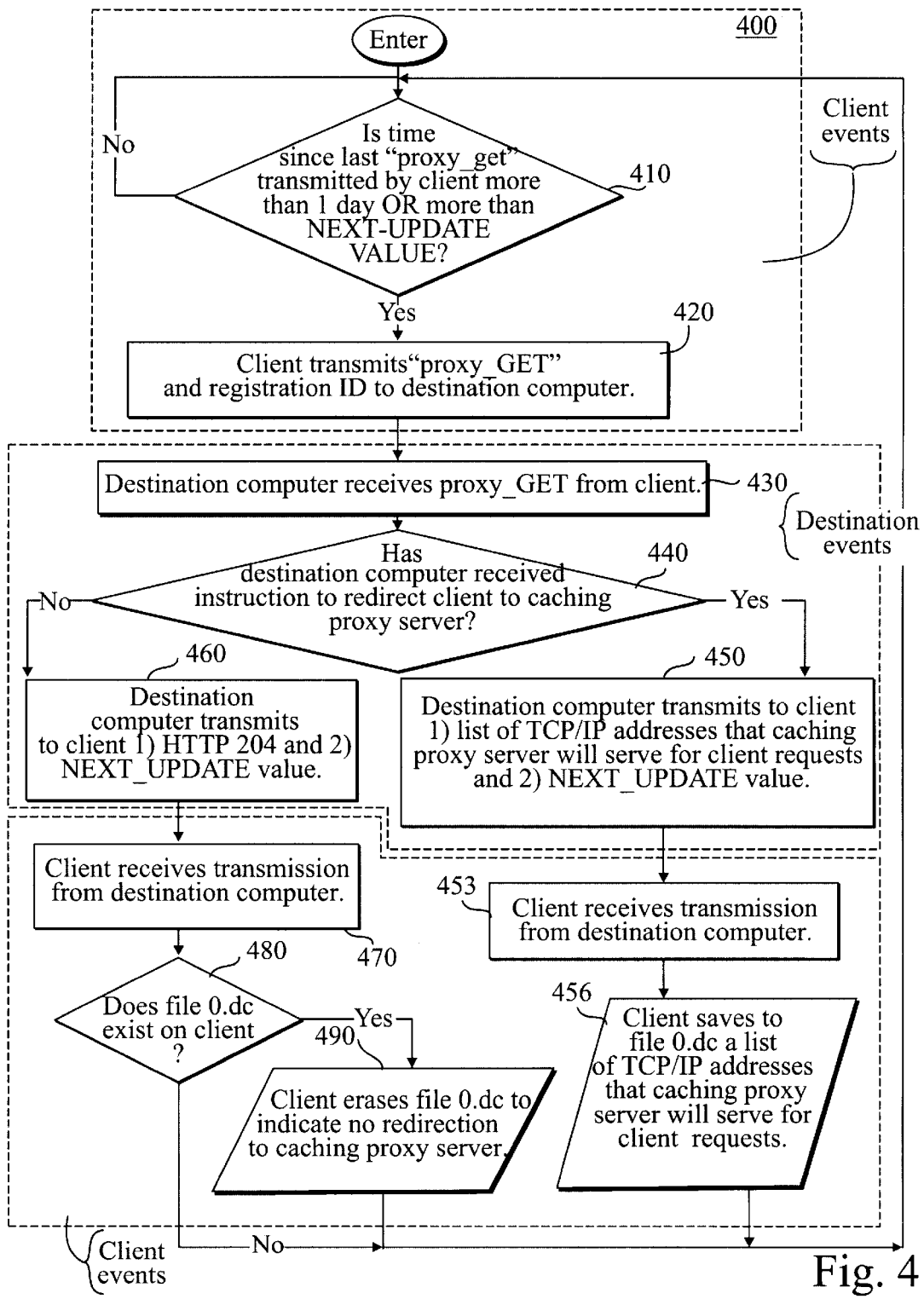
FIG. 4 illustrates the flow-of-control and sequence of events between the client, the caching proxy server and the destination server in regards to a "proxy_GET" request in accordance with a preferred embodiment.

FIG. 4 illustrates the flow-of-control and sequence of events between the client, the caching proxy server and the destination server in regards to a "proxy_GET" request when no caching proxy server is actively serving as a caching proxy server to the client in accordance with a preferred embodiment. The polling loop of events begins 400 on the client computer whereby if the amount of time that has lapsed since the last proxy_GET was transmitted by the client to the destination computer is not greater than one day, and if the amount of time that has lapsed since the last proxy_GET was transmitted by the client to the destination computer is not greater than the value set in NEXT_UPDATE 410, then loop 410 is reiterated, otherwise the client transmits a proxy_GET to the destination computer 420.

The destination computer receives the proxy_GET transmission from the client 430. If the destination computer has received instruction to redirect client to caching proxy server 440, then the destination computer transmits to client 1) a list of TCP/IP addresses that the caching proxy server will serve for client requests, 2) the NEXT_UPDATE value, and 3) a flag indicating whether a private content channel within the intranet is to be enabled by the client 450, the transmission is received by the client 453 and the client saves the list of TCP/IP addresses that the caching proxy server will serve for client requests to file 0.dc 456. Otherwise, the destination computer transmits to client 1) HTTP 204 indicating that and 2) NEXT_UPDATE value 460 and the client receives the transmission from the destination computer 470 and, if a file named "0.dc" exists on the client computer 480, the client erases file 0.dc to indicate no redirection to a caching proxy server is in effect 490. Then the sequence of events returns to the beginning of the loop 400.

When an active caching proxy server receives a proxy_GET request from a client

Figures 5A, 5B:
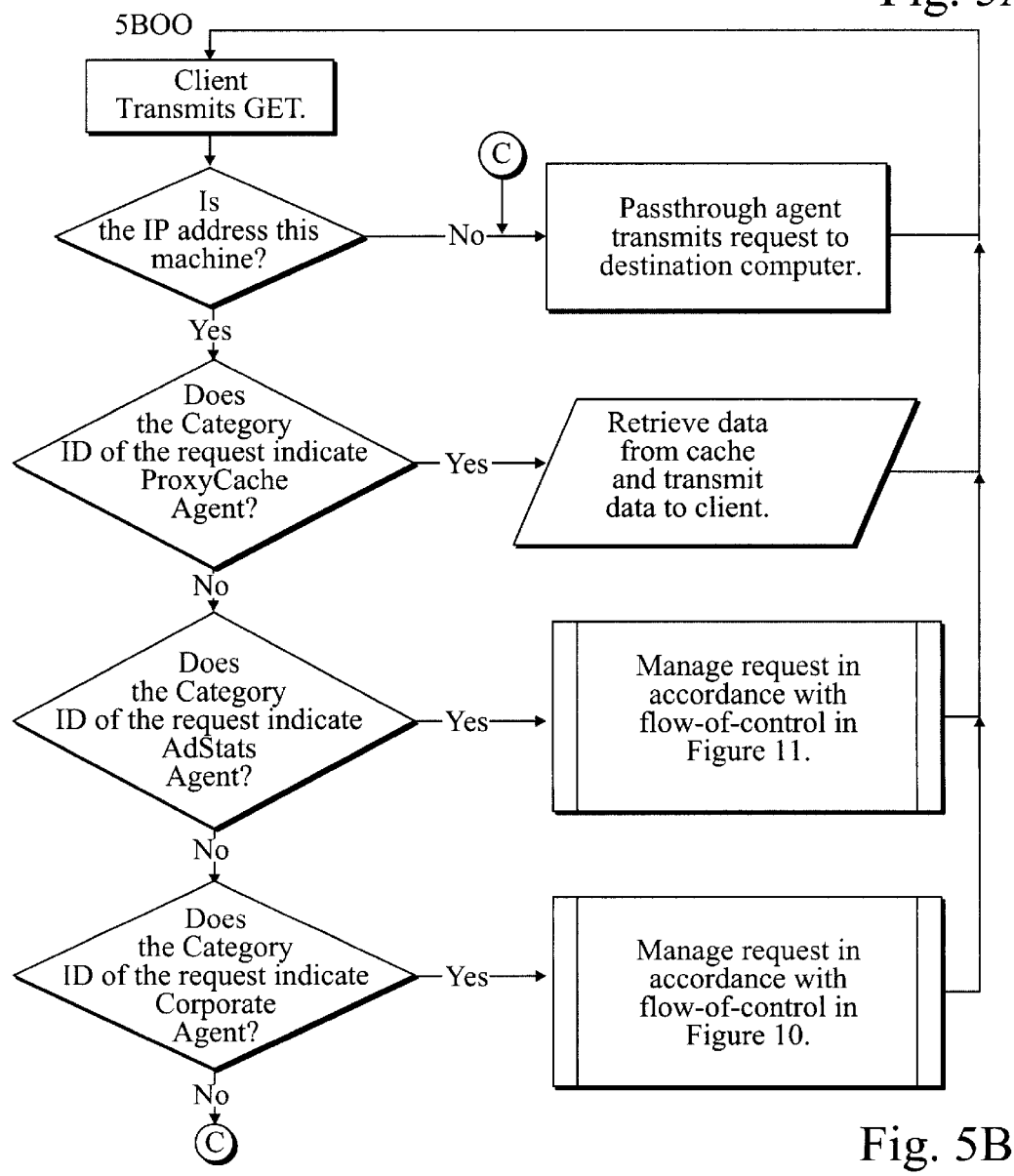
FIG. 5A illustrates formats of HTTP GET requests by a client to a caching proxy server or a destination computer in accordance with a preferred embodiment.
FIG. 5B illustrates the flow-control and sequence of events between the client, the caching proxy server and the destination server in regards to a GET request by the client in accordance with a preferred embodiment.

FIG. 5A illustrates formats of HTTP GET requests by a client to a caching proxy server or a destination computer in accordance with a preferred embodiment.

FIG. 5B illustrates the flow-control and sequence of events between the client, the caching proxy server and the destination server in regards to a GET request by the client in accordance with a preferred embodiment. The client transmits a GET request from the computer at the IP address selected from the 0.dc file 5B00. If the caching proxy server determines that the IP address is for a machine other than the caching proxy server 5B10, the caching proxy server passthrough agent transmits the request to the destination computer 5B20 and the client computer regains flow-of-control 5B00. If the caching proxy server determines that the category ID of the request indicates the proxycache agent 5B30, the caching proxy server retrieves the requested data from the cache and transmits the data to the client 5B40 and the client regains flow-of-control 5B00. If the caching proxy server determines that the category ID of the request indicates the adstats agent 5B50, the caching proxy server manages the request data in accordance with 5B60 and the client regains flow-of-control 5B00. If the caching proxy server determines that the category ID of the request indicates the corporate agent 5B50, the caching proxy server manages the request data in accordance with 5B60 and the client regains flow-of-control 5B00. Otherwise, the caching proxy server passthrough agent transmits the request to the destination computer 5B20 and the client computer regains flow-of-control 5B00.

Figure 6A:
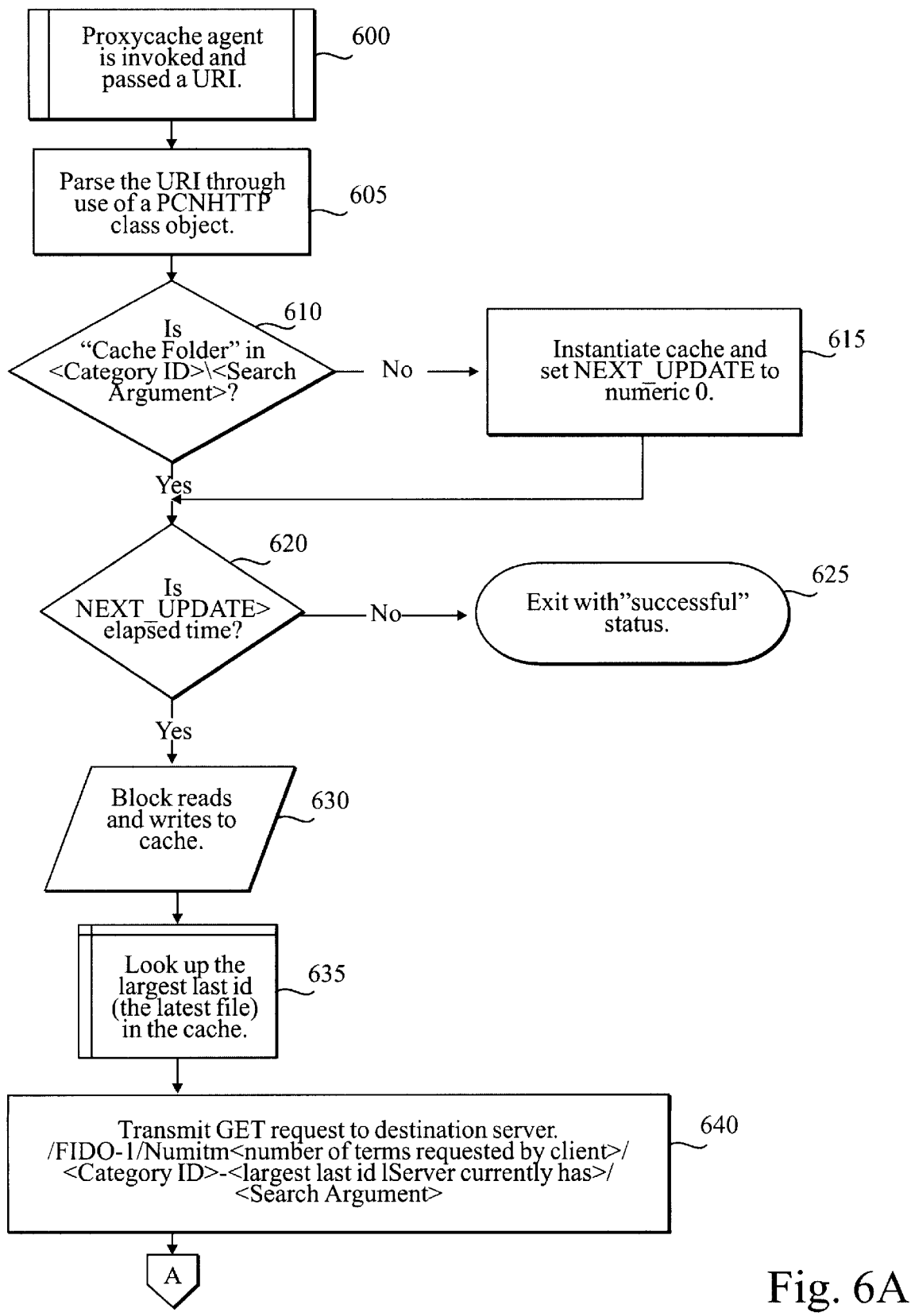
FIGS. 6A and 6B illustrate the flow-of-control of the Proxy cache agent on the caching proxy server in accordance with a preferred embodiment.
Figure 6B:
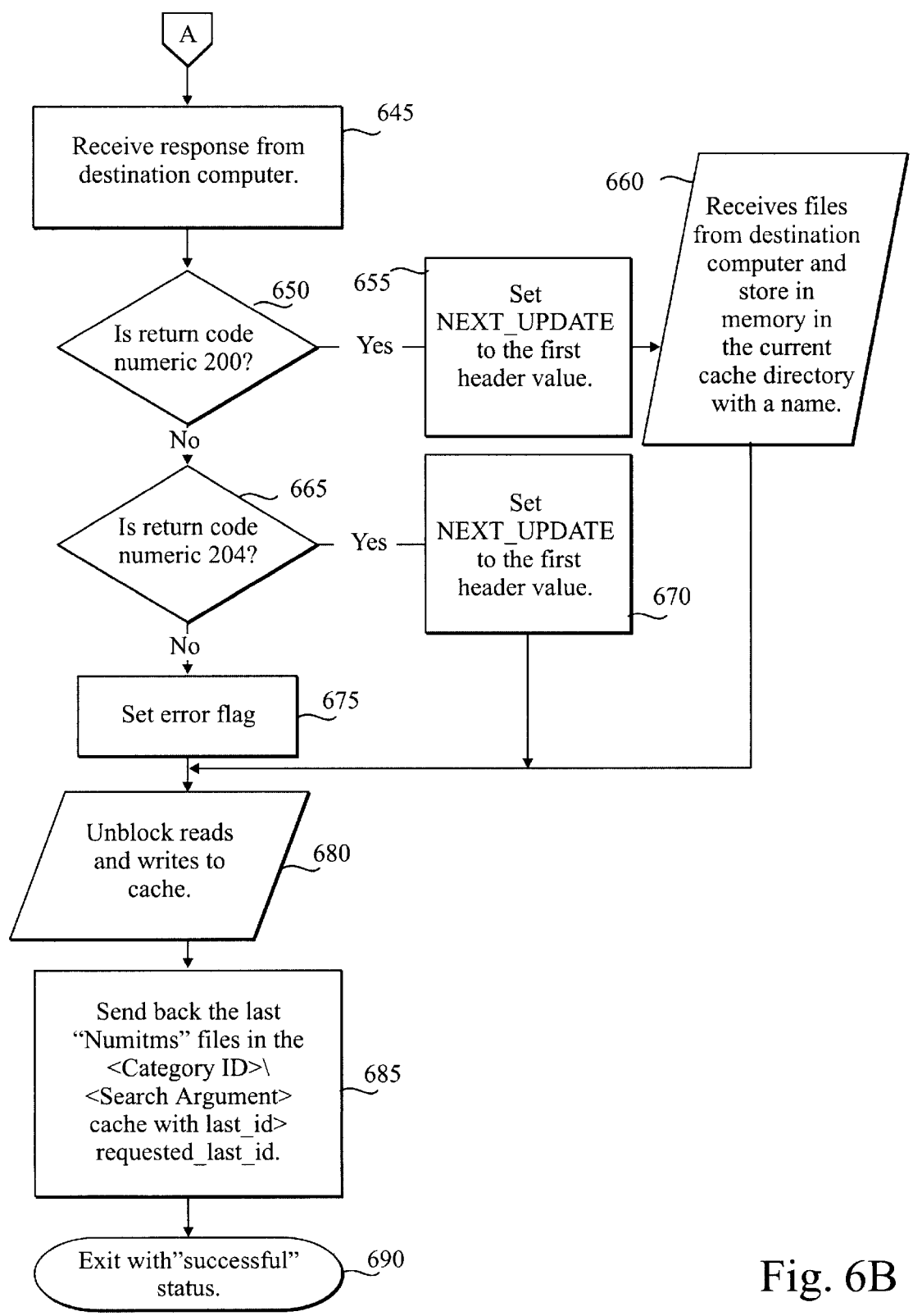

FIGS. 6A and 6B illustrate the flow-of-control of the Proxycache agent on the caching proxy server in accordance with a preferred embodiment. The primary purpose of this flow-of-control is to refresh the cache at designated intervals. Flow-of-control begins with a URI passed to the proxycache agent 600. The URI is parsed through use a PCNHTTP class object 605 and, if "Cache Folder" is in <Category ID>\<Search Argument> 610, then a cache is instantiated and NEXT_UPDATE is set to numeric 0 615. If NEXT_UPDATE is not past the elapsed time 620 indicating that the cache not need be refreshed, the flow-of-control is exited with a successful status 625.

Read and write operations are blocked from the cache 630. The largest last id (the latest file) in the cache is identified 635 and a GET request is transmitted to the destination server in the following format: /FIDO-1/NumItm-<number of items requested by client>/<Category ID>-<largest last id caching proxy server currently has>/<Search Argument> 640. The response from the destination computer is received 645.

If the return code from the response is numeric decimal 200 650, then NEXT_UPDATE is set to the first header value 655 and 0 or more files are received from the destination computer and segmented and stored in memory in the current cache directory with a name equal to the "Last ID" associated with the file 660.

If the return code from the response is numeric decimal 204 665, NEXT_UPDATE is set to a value equivalent and representative of one hour 670, otherwise, and error flag is set indicating that the destination server did not respond to the request appropriately 675.

Read and write operations to the caches are unblocked 680, the last "NumItms" files in the <Category ID>\<Search Argument> in cache with last_id>requested_last_id are transmitted 685, and the flow-of-control is exited with a successful status 690.

FIG. 7 illustrates the format of the 0.dc file in accordance with a preferred embodiment. A 0.dc file resides on each client computer that communicates with a caching proxy server. The data in the file is transmitted to the client from the destination computer or the redirection agent of an active caching proxy server in response to a proxy_GET request (category 66560) from the client. This file is used to identify the IP address of the caching proxy server to the client. The first entry is the name of the destination computer that transmitted the data in the 0.dc file to the client 700. The second entry is a flag indicating whether or not the private content channel is enabled 710, numeric 0 indicates no and numeric 1 indicates yes. The originator of the 0.dc file is identified at 720. The usage mode of how the following list of caching server IP addresses is to be used is indicated at 730, numeric 1 indicates that an IP address is to be selected randomly from the list by the client so that the capacity load on the caching proxy servers from the clients will be more even balanced, and numeric 0 indicates sequential selection from the list. An interative list of at least one caching proxy server address(es) follows 740. This address is used by the client computer instead of the IP address of the destination computer for HTTP GET requests so that cached data on the caching proxy server can be used to satisfy data requests, relieving the firewall of the burden of passing on the request to the destination computer and returning the data from the destination computer to the client.

FIG. 8 illustrates the format of the corp.dat file in accordance with a preferred embodiment. A private corporate channel configuration file, named corp.dat, must reside in the directory, %PCN_HOME%\corp to enable the private channel. The name of the channel, channel_name, is displayed on the channel button in the PointCast Viewer in character string format 900. SS_LOGO, the filename of the logo of the GIF or JPEG file that is to be displayed in the SmartScreen to replace the commercial that normally plays 910. This line, AD_LOGO and the SS_FILE line are used by the client to determine whether it needs to fetch the files specified. If the files specified by these three lines are already present on the client, it will not attempt to fetch them again. Thus, if an administrator changes one of these files, the administrator will have to change the name of the file to signal the client to fetch it again.

AD_LOGO is the character string name of the logo of the GIF or JPEG file that is to be displayed in place of the commercial while the user is in the corporate channel of the PointCast Viewer 920. SS_FILE is the character string name of the SmartScreen file selected by the MIS administrator from the list of template SmartScreens provided with the Content Server 930. This SmartScreen will be played by the client when it is time to play a SmartScreen for the corporate channel. FLASH_FILE is the character string name of the file that contains a list of messages that scroll across the ticker tape, alongside the stock quotes and sports scores 940.

GROUP is the character string name that appears on the Nth "tab" of the group directory window 950. Following the GROUP line are the description lines for all the documents in this group. All document lines that describe the same document must NOT be separated by other command lines, although blank and comment lines are allowed. DOC_SUBJECT=subjectN_M is a character string subject of the Mth document in the Nth group, as displayed in the group directory window 960. This is also the text that appears in a title sprout when the SmartScreen for this channel comes up. DOC_ID=DocIDN_M is the character string identifier (URL) used to load the source article 970. This must follow its corresponding DOC_SUBJECT line. In general, DocIDN_M takes the format of an URL as defined by W3C. DOC_SUMMARY=sumN_M is the character string HTML document that will appear as a summary sprout when the SmartScreen for this channel is intialized 980. This field usually consists of the first few paragraphs of the article, although an administrator can specify whatever he or she would like to appear as the summary sprout if the first few paragraphs are not appropriate. This must follow its corresponding DOC_ID line. DOC_SUMMARY_END denotes the end of the HTML document above 990.

The entire GROUP section 950–990 can be substituted with a single line with the following format: GROUP_FILE=location where location specifies a file which contains a GROUP section. location can either be a URL if the file exists on a remote Web server, or a full-qualified pathname if the file exists on the same machine as the Content Server. When a client requests a corp.dat file, the Content Server will parse the file and substitute any GROUP_FILE statements with the contents of the file identified by location before returning the corp.dat file to the client. If the Content Server is unable to locate the file in question, the entire line is ignored and a corp.dat file is generated without that particular group. A warning is signaled.

Figure 9A:
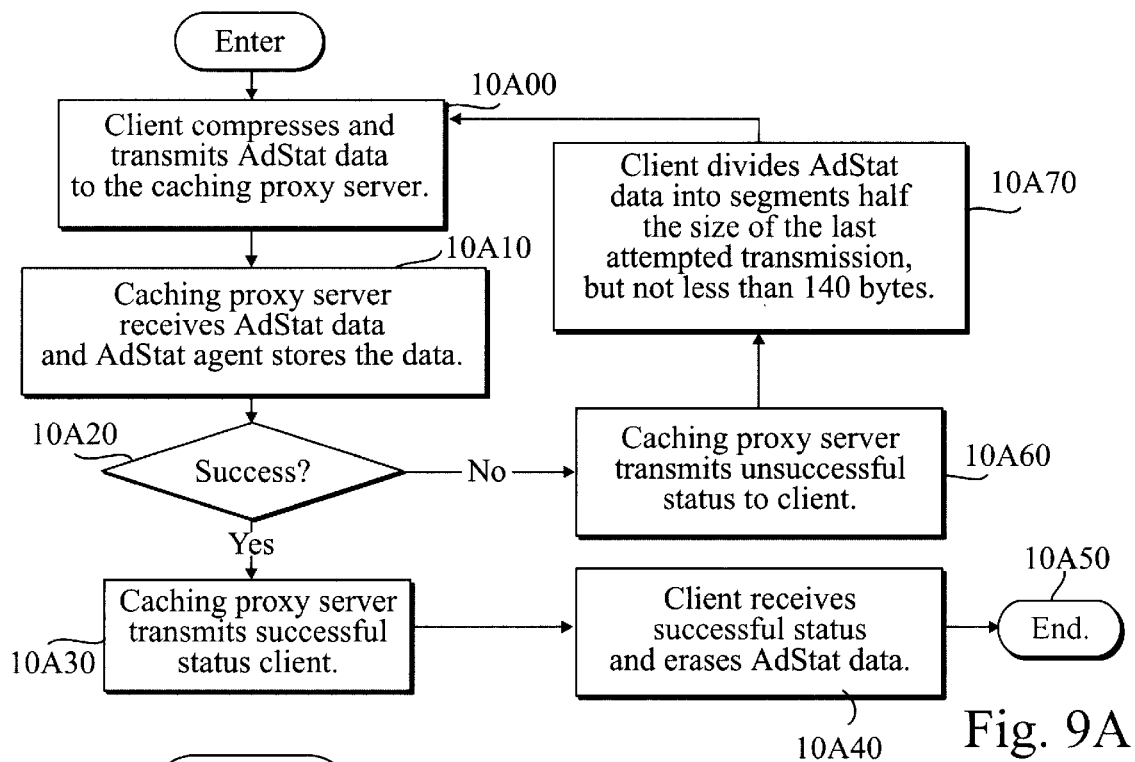
FIG. 9 illustrates the flow-of-control of the retrieval of data Adstats data in accordance with a preferred embodiment.
Figure 9B:
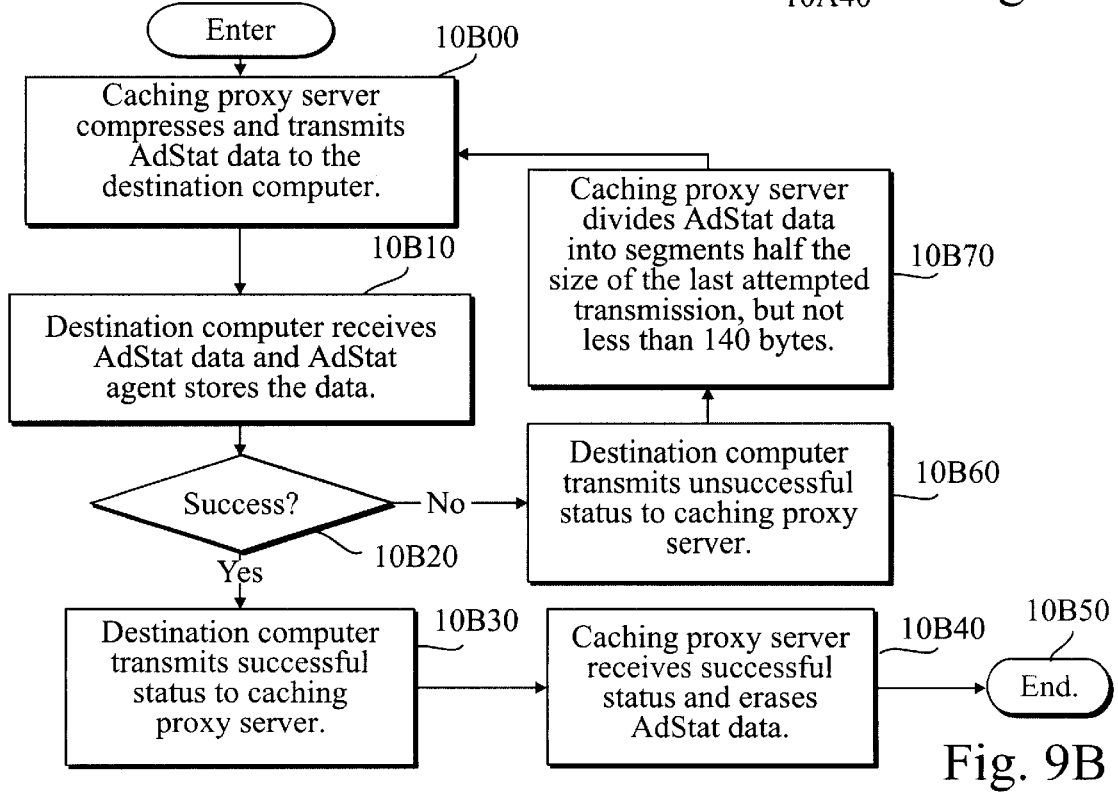

FIGS. 9A and 9B illustrate the flow-of-control of the retrieval of AdStats data in accordance with a preferred embodiment.

AdStats data is statistical data on advertisements viewed by the user on the client computer. However, any other type of statistical information on usage of the client computer or content could also be involved.

To upload the AdStats data from the client to the caching proxy server, the client compresses and transmits AdStat data to the caching proxy server 10A00. The caching proxy server receives AdStat data and AdStat agent stores the data on 10A10. If the caching proxy server AdStat agent successfully received and stored the AdStat data 10A20 the caching proxy server transmits successful status to client 10A30 and when the client receives successful status, the client erases AdStat data 10A40 and the flow-of-control ends 10A50. If the caching proxy server AdStat agent did not successfully receive and store the AdStat data 10A20 the caching proxy server transmits unsuccessful status to the client 10A60, the client divides AdStat data into segments half the size of the last attempted unsuccessful transmission, but not less than 140 bytes 10A70 and the flow-of-control continues at the beginning to attempt another transmission 10A00.

To upload the AdStats data from the caching proxy server to the destination computer, the caching proxy server compresses and transmits AdStat data to the destination computer 10B00. The destination computer receives AdStat data and AdStat agent stores the data 10B10. If the destination computer AdStat agent successfully received and stored the AdStat data 10B20 the destination computer transmits successful status to caching proxy server 10B30 and when the caching proxy server receives successful status the caching proxy server erases AdStat data 10B40 and the flow-of-control ends 10B50. If the destination computer AdStat agent did not successfully receive and store the AdStat data 10B20 the destination computer transmits unsuccessful status to the caching proxy server 10B60, the caching proxy server divides AdStat data into segments half the size of the last attempted unsuccessful transmission, but not less than 140 bytes 10B70 and the flow-of-control continues at the beginning to attempt another transmission 10B00.

Figure 10:
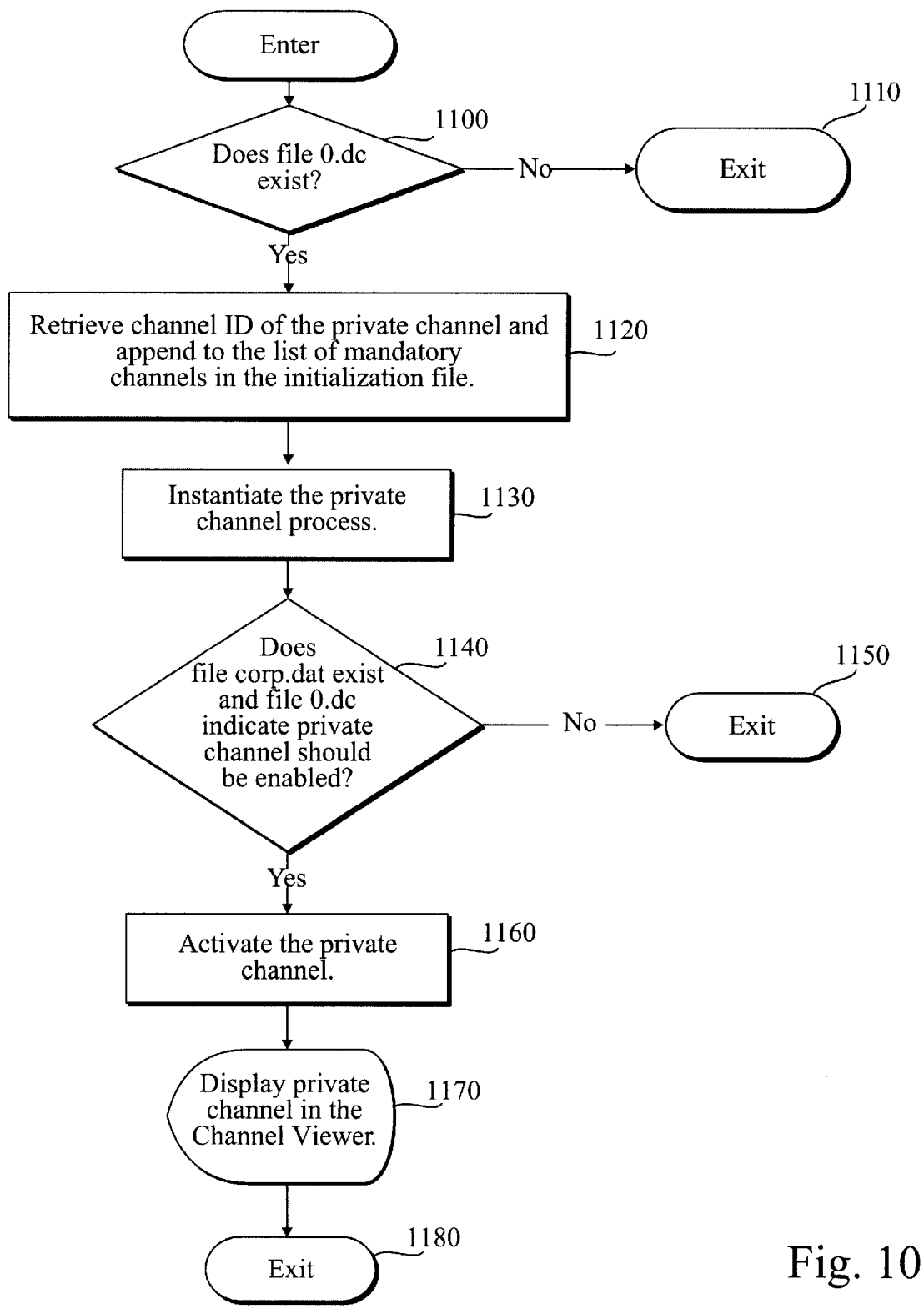
FIG. 10 illustrates the flow-of-control of establishing communication between a client and the Content Server in accordance with a preferred embodiment.

FIG. 10 illustrates the flow-of-control on a client in establishing communication between the client and the Content Server in accordance with a preferred embodiment. The Content Server enables an organization to implement an internal electronic communication infrastructure.

If file 0.dc does not exist 1100, indicating that no Content Server for the client exists, then flow-of-control terminates 1110. Otherwise, the channel ID of the private channel is retrieved and appended to the list of mandatory channels in the initialization file 1120 and the private channel DLL is instantiated 1130. If either file corp.dat does not exist or file 0.dc indicates that the private channel should not be enabled 1140, then flow-of-control terminates 1150. Otherwise, the private channel is activated 1160 and the Channel Viewer displays the private channel to indicate to the user that the private channel is active 1170 and then flow-of-control terminates 1180.

Figure 11A:
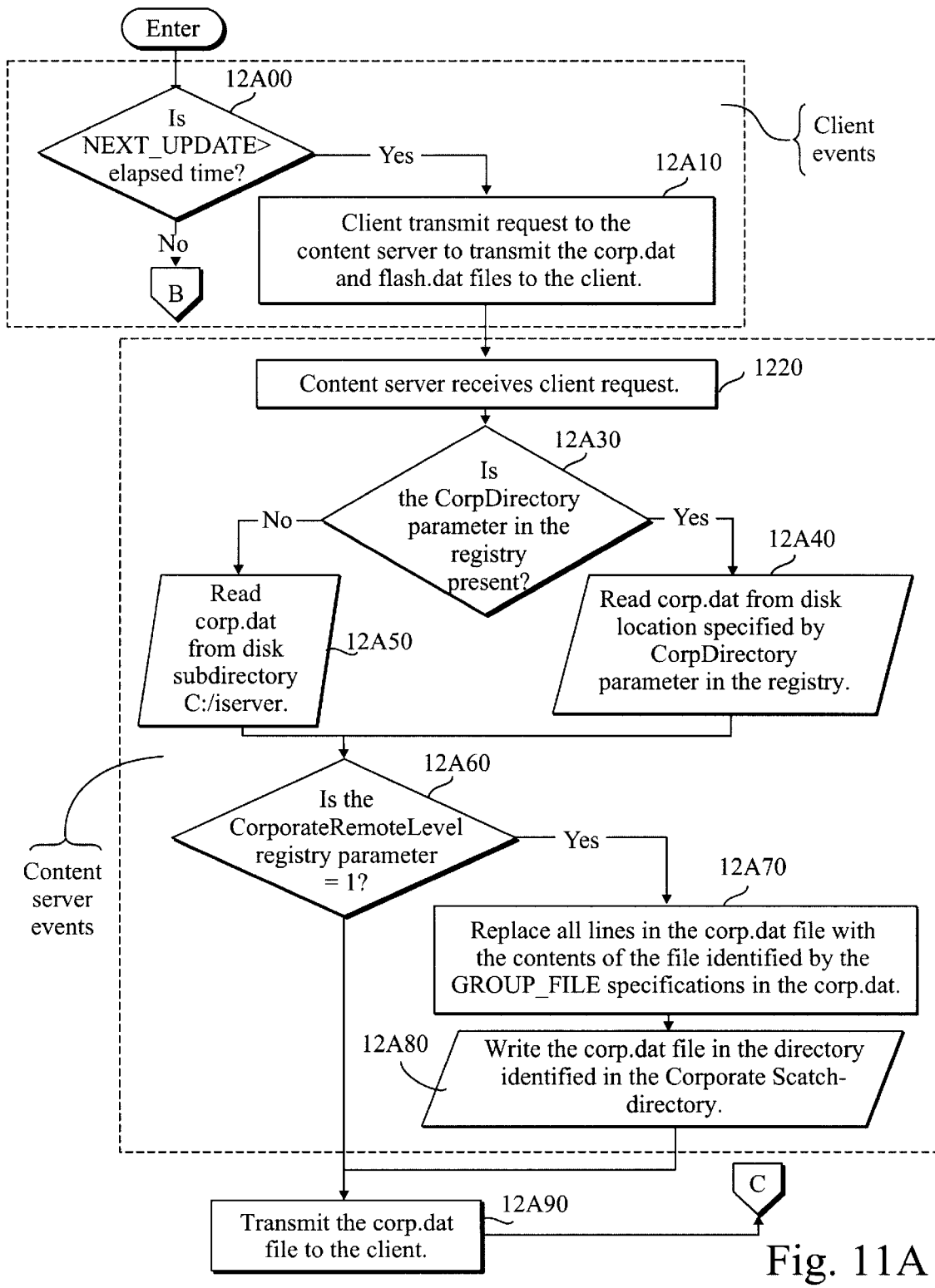
FIGS. 11A and 11B illustrate the flow-of-control of the retrieval of data by a client from the content server in accordance with a preferred embodiment.
Figure 11B:
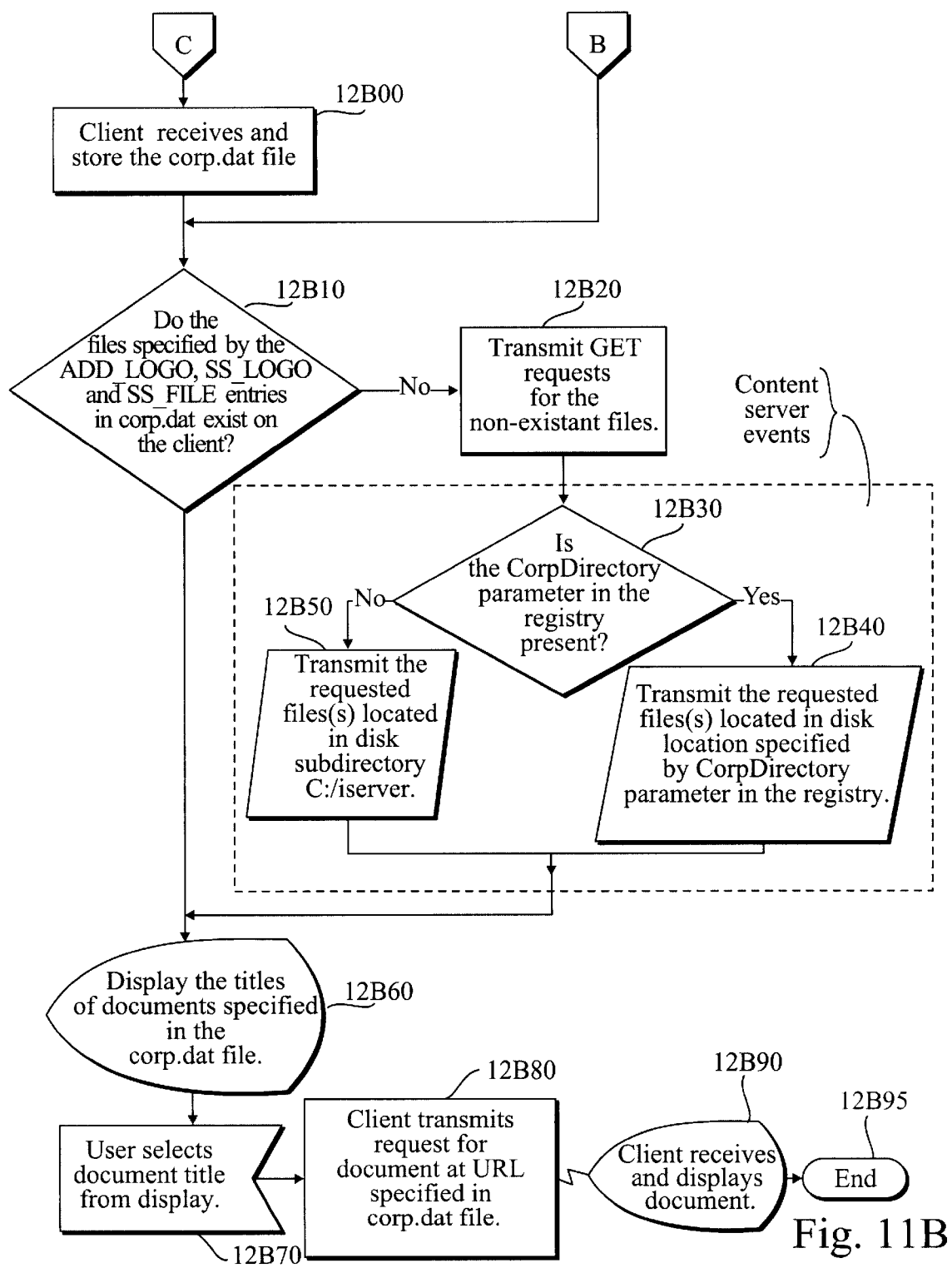

FIGS. 11A and 11B illustrate the flow-of-control of the retrieval of data by a client from the Content Server in accordance with a preferred embodiment. In order to perform a HTTP GET request, the client transmits a request to the content server to transmit the corp.dat and flash.dat files to the client.

The flow-of-control of a HTTP GET begins on the client. If the NEXT-UPDATE value has expired, 12A00, indicating that the client needs a new copy of the corp.dat file, the client transmits a request to the Content Server to transmit the corp.dat and flash.dat files to the client 12A10. When the Content Server receives the request, 12A20, if the CorpDirectory parameter in the registry on the Content Server present, 12A30, indicating that the CorpDirectory is active, the Content Server will read the corp.dat file from the disk location specified by CorpDirectory parameter in the registry on the Content Server, 12A40, otherwise the Content Server will read the corp.dat file from disk at subdirectory C:/vserver 12A50.

Then, if the CorporateRemoteLevel registry parameter on the Content Server equals numeric 1, 12A60, all lines in the corp.dat file that are name=value pairs with a name of GROUP_FILE are resolved by replacing the lines with the contents of the file identified by the value portion of the GROUP_FILE specification, 12A70, and then the corp.dat file is stored in the directory identified in the CorporateScatch-Directory 12A80.

More specifically, the CorporateScratchDirectory actually contains two subdirectories, /0 and /1 referred to as cache #0 and cache #1. The Content Server always begins by serving requests for the resolved corp.dat from cache #1. As soon as the corp.dat file in the CorpDirectory is changed, or a fixed time specification of minutes have elapsed, another corp.dat and its associated files are built in cache #0.

While the other corp.dat file is being built in cache #0, the resolved corp.dat file in cache #1 is transmitted to clients. When cache #0 is complete, the Content Server compares the contents of the two caches. If the files have the same contents, the Content Server continues to serve clients from cache #1. If the corp.dat file contents in cache #0 and cache #0 are different, the Content Server switches all new clients to cache #0 and starts the process over by building a new corp.dat file in cache #1. Then the Content Server transmits the corp.data file to the client 12A90. The client receives and stores the corp.dat file transmitted by the Content Server 12B00.

If the files specified by the AD_LOGO, SS_LOGO and SS_FILE entries in the corp.dat file do not exist on the client 12B10, the client will transmit GET requests to the Content Server for the non-existent files 12B20, if the CorpDirectory parameter in the registry on the Content Server present, 12B30, indicating that the CorpDirectory is active, the Content Server will retrieve the request file(s) from the disk location specified by the CorpDirectory parameter in the registry on the Content Server and transmit the file to the requesting client, 12B40, otherwise the Content Server will retrieve the requested file(s) from disk at subdirectory C:/vserver and transmit the file(s) to the requesting client 12B50.

The client then will display through a browser the titles of documents specified in the corp.dat file 12B60. When the user selects one of the documents 12B70, the client transmits a request for the document to the computer addressed by the URL specified for the document in the corp.dat file on the client 12B80, and the client receives and displays the requested document 12B90. The flow-of-control for the retrieval of documents for the Content Server ends.

The documents that the Content Server serves to the clients may be in any format, such as ASCII text, MIME, Microsoft Word, Rich Text Format, compressed ZIP, graphics GIF or HTML. In the preferred embodiment the Content Server serves HTML files for use with a browser on the client computer.

System clients provide an intuitive user interface with automatic content delivery to your desktop. To fulfill our commitment to providing an enjoyable user experience, we have many challenges. The Data Center needs to always be available for content updates, able to deliver content fast, and able to scale up capacity quickly without interruption to service. The architecture of the System Network is composed of an Internet security system, a robust network infrastructure, a Request Processing Module, and a Content Processing Module.

Figure 12:
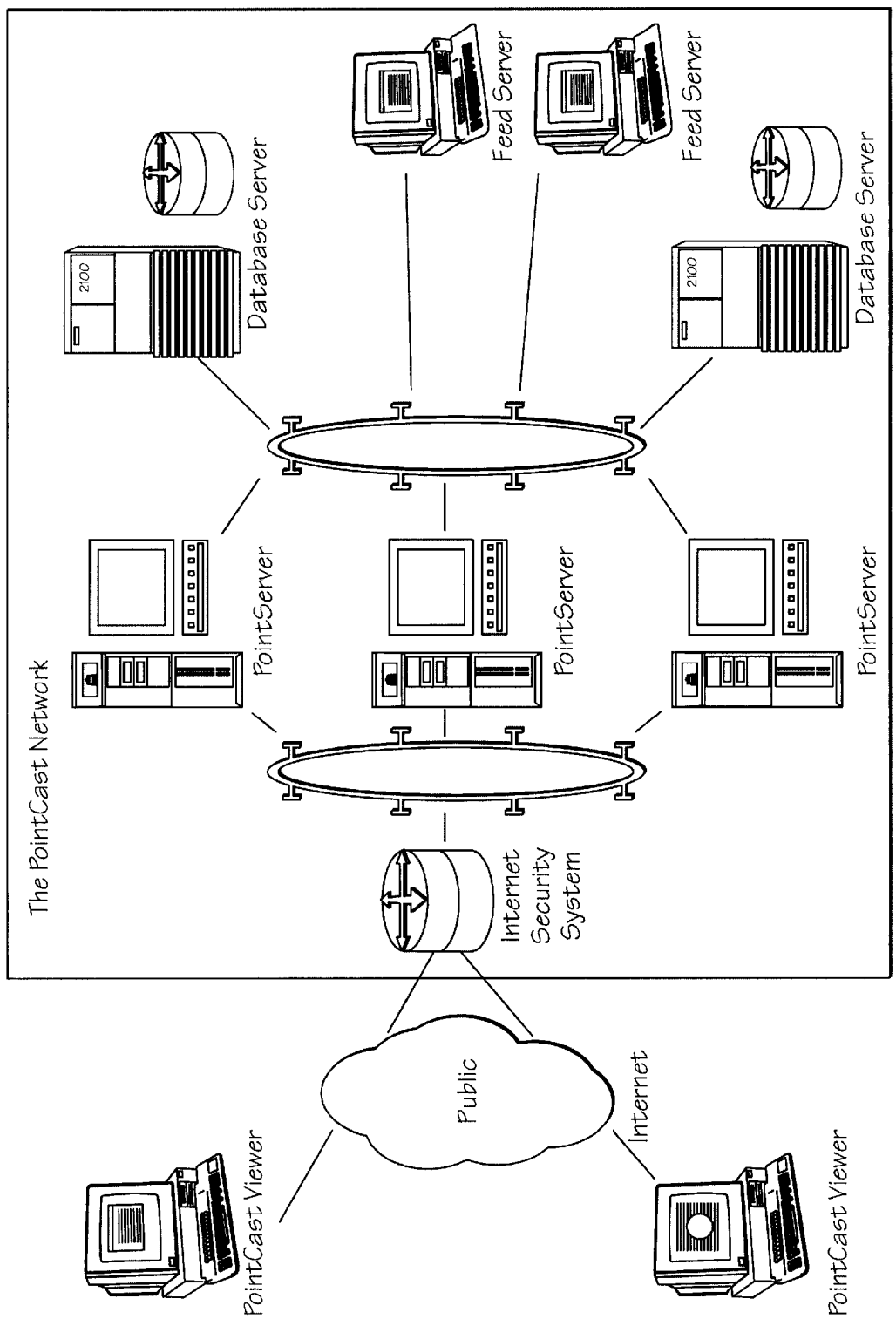
FIGS. 12 and 13 are system diagrams of the network environment in accordance with a preferred embodiment.
Figure 13:
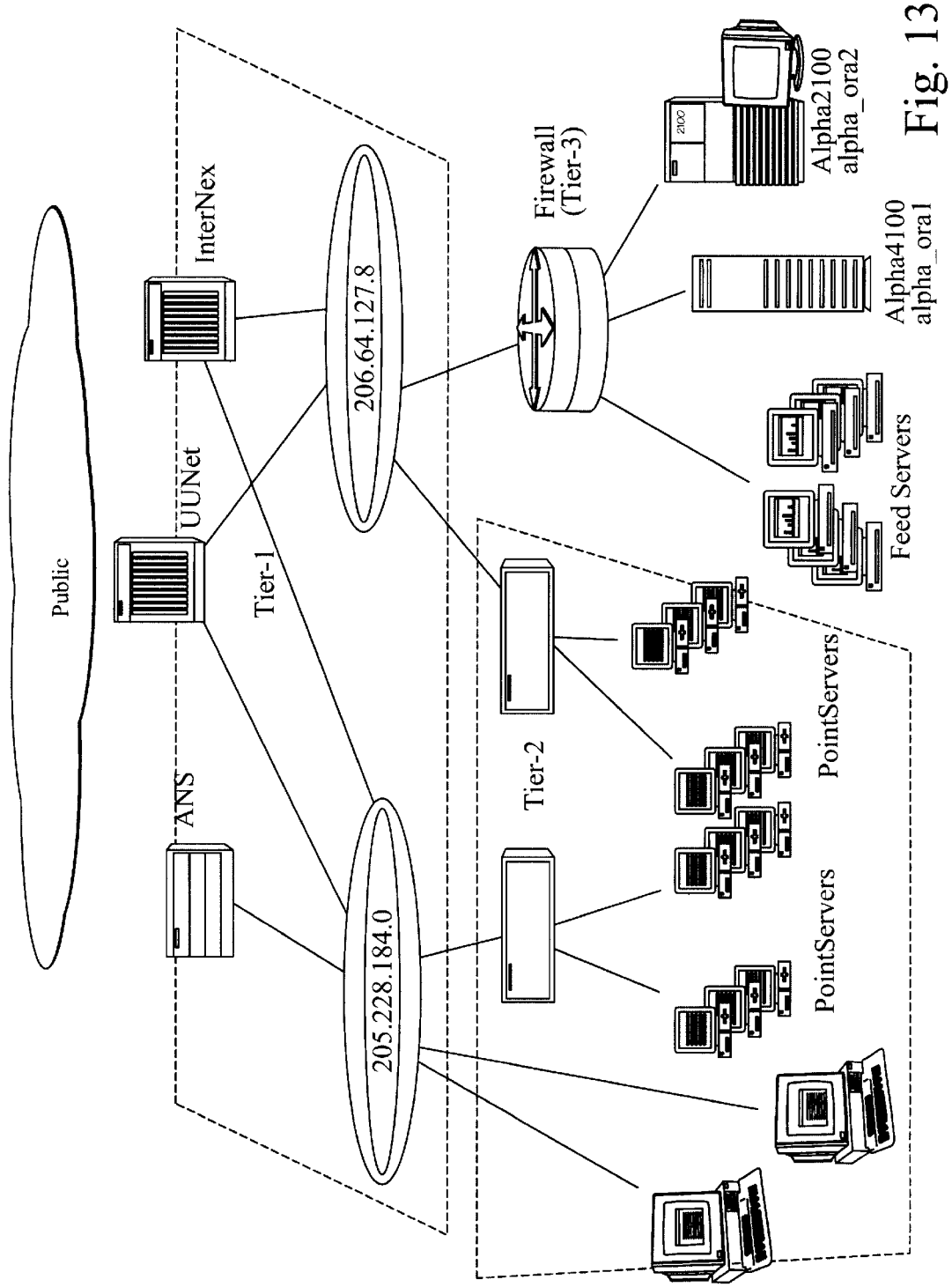
Figure 14:
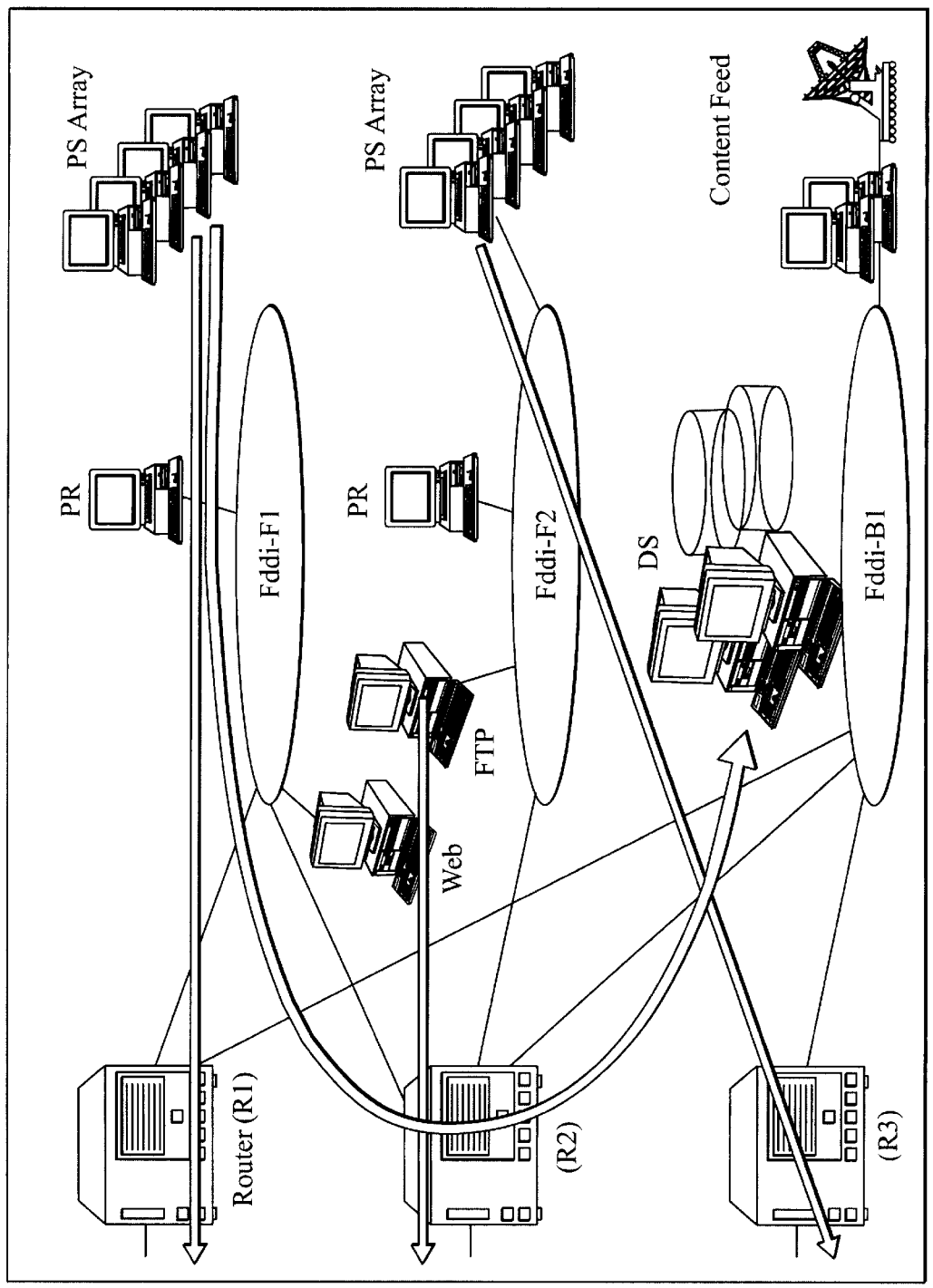
FIG. 14 is a system diagram of the network routing environment in accordance with a preferred embodiment.

Internet security system acts as an Internet firewall which permits only authorized accesses to The System Network-like Web, FTP, and client update accesses. FIG. 12 is a system diagram of the network environment in accordance with a preferred embodiment. The network topology is composed of 2 FDDI rings and 10/100 Switched Ethernet segments. FDDI rings deliver high-performance and high-availability to critical components of the network-like Internet routers, database servers, and 10/100 switching hubs which connect Servers. FIGS. 13 and 14 are a system diagram of the network routing environment in accordance with a preferred embodiment.

Request Processing Module is composed of Routers and Servers running Microsoft WindowsNT operation system. Routers provide the load-balancing functionality by redirecting PCN Clients to available Servers. Servers process client requests and transmit requested contents back to clients. If requested contents aren't in Server's local cache, it will obtain them from data servers.

Figure 15:
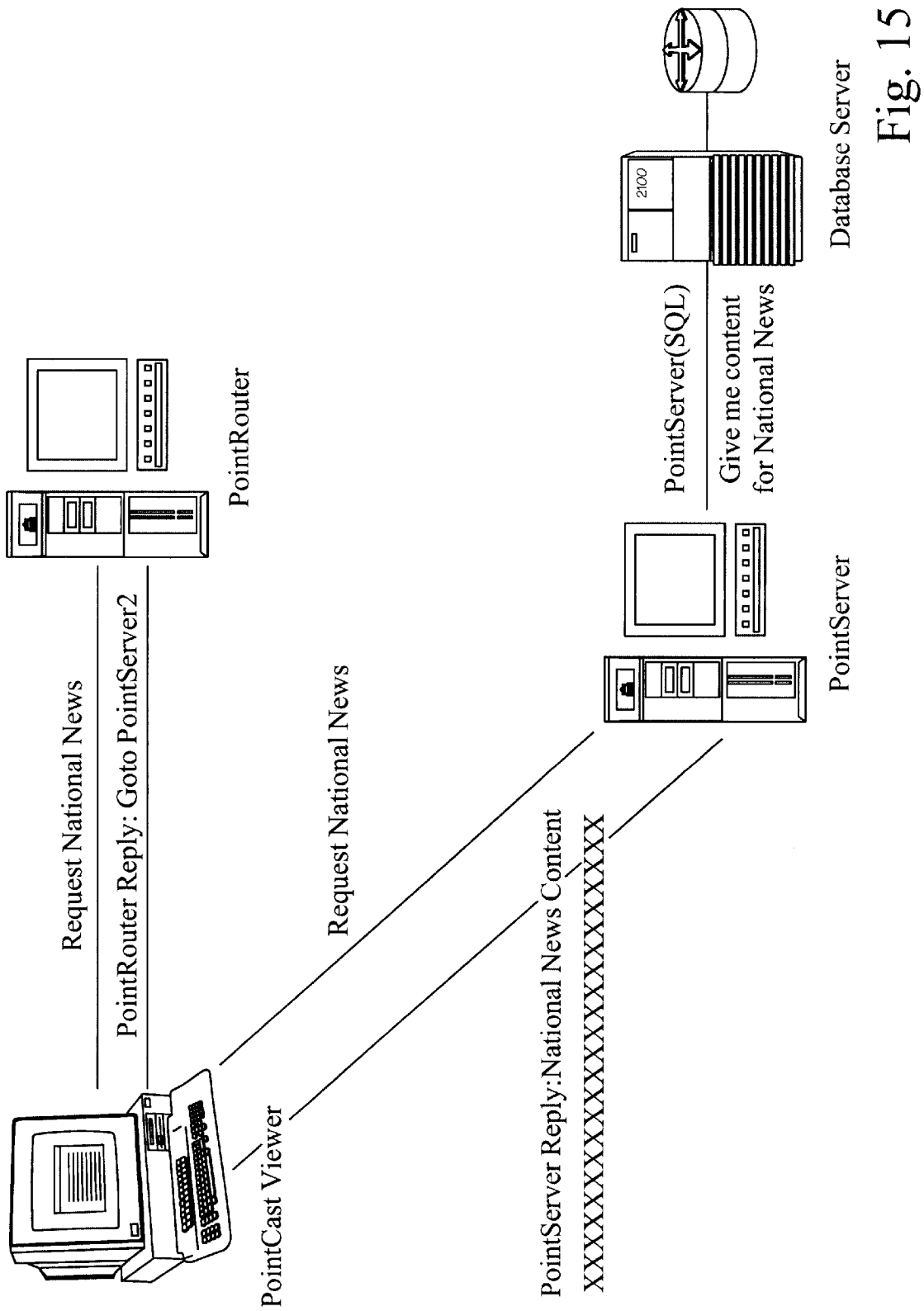
FIG. 15 is a system flow diagram of the network transmissions in accordance with a preferred embodiment.

FIG. 15 is a system flow diagram of the network transmissions in accordance with a preferred embodiment. A content Processing Module is composed of a variety of Feed Handling Servers running Microsoft WindowsNT. Many custom applications were developed to handle incoming feeds in a variety of ways—like via Satellite, FTP, Web, and Email. There are two components to the feed handling process. First, store incoming raw contents and convert them to HTML format. Second, insert new contents to all production databases.

Figure 16:
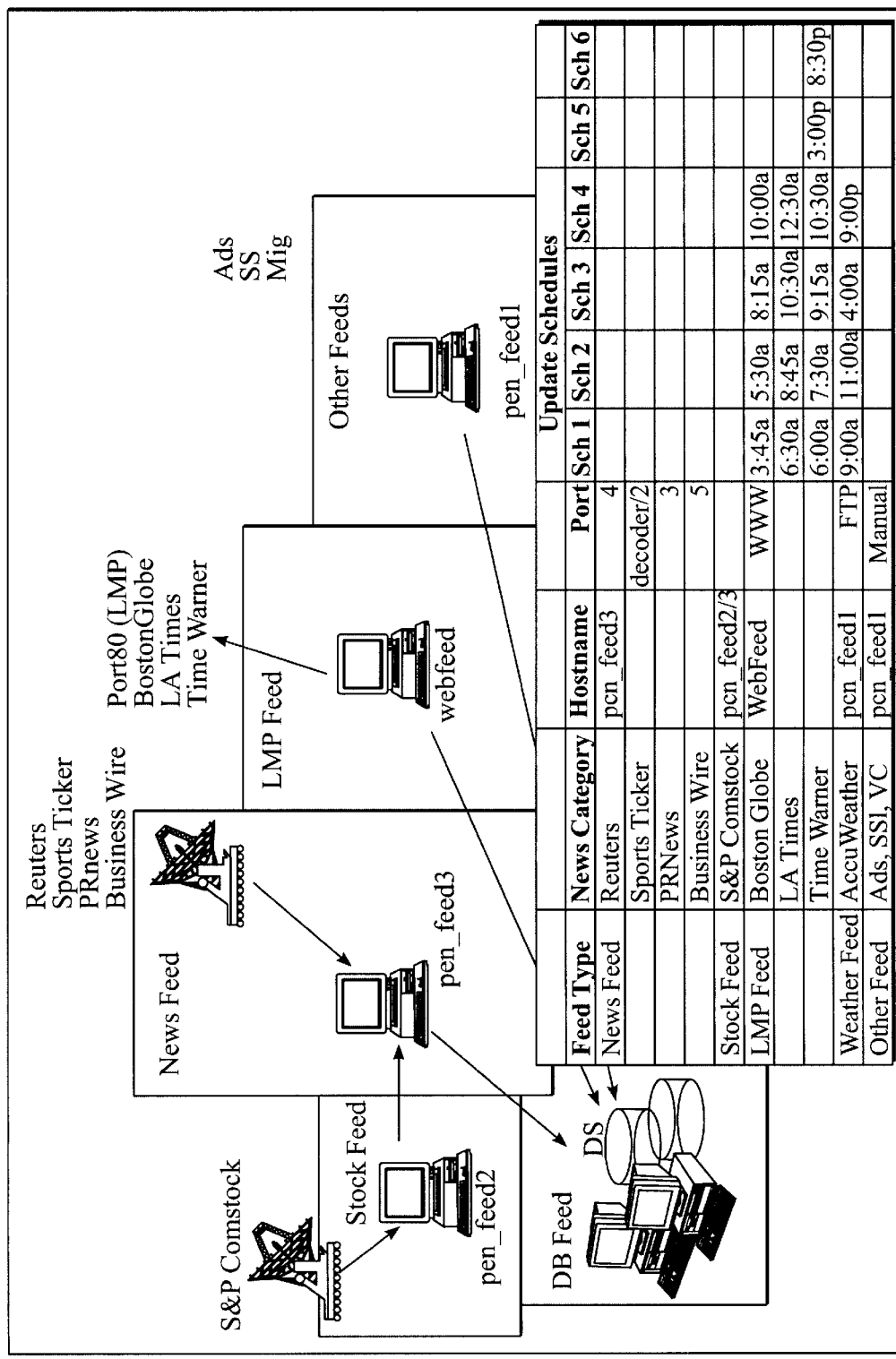
FIG. 16 is a system flow diagram of the network Data Center Capacity Planning and Equipment Requirement in accordance with a preferred embodiment.

FIG. 16 is a system flow diagram of the network Data Center Capacity Planning and Equipment Requirement in accordance with a preferred embodiment. The System Data Center architecture uses industry standard computers and networking equipment. The equipment is very scaleable. Nevertheless, we need to identify the capacity of the Data Center that we intend to support, based on active clients. An accurate count of active clients would be the total distinct clients update from the Data Center on a monthly basis. The following spreadsheet provides an estimated equipment list for different sizes of Data Center by daily active users. Daily active users are usually sixty percent of monthly active users. FIG. 17 is a spreadsheet illustrating various sources of information in accordance with a preferred embodiment.

Data Center Implementation Strategy

In order to successfully implement a Data Center, we need to locate and/or prepare a facility, order necessary equipment, install and configure equipment, and run acceptance tests. Data Center has a unique facility requirement; it requires dedicated air conditioner to control temperature and humidity and power backup system. Power backup system includes UPS for power protection and power generator to keep equipment running during power outage.

1. Facility Preparation—A typical Data Center facility requires a raised floor for ventilation and cabling. Dedicated air conditioner is needed to maintain temperature around 60 degree F. and humidity around 30. All equipment should connect to UPS which then connect to utility power with power generator bypass switch. It is common to install a UPS on the bottom of each machine cabinet. Network cables should be laid under the raised floor to each equipment cabinet with proper labels.

2. Equipment Purchase—Many of the network equipment and data servers require long lead time to order—sometimes up to 1 month. Therefore, it is important to order them early. This is especially true for Internet connection. Depending on bandwidth requirements, it can take up to 60–90 days to implement a DS3 circuit in the United States. Company may also need to register company domain name and IP subnet addresses.

3. Installation and Configuration—Data Center requires a functional network before other equipment can be efficiently installed and configured. It is also important to test Internet connectivity and configure network security before proceeding to other tasks. Database servers are next in the priority list. They are required to test feed servers and Servers. Monitoring tools should also be installed to monitor network, database, and server utilization.

4. Acceptance Test—This involves testing client updates and performing load simulation tests. After content updates are successful, we still need to fine-tune the Data Center setup. The Data Center's ability to handle high-load efficiently involves balancing the database server load, as well as balancing the network load. The real acceptance test is usually perform after the Data Center goes production. We need to assure that Servers are processing acceptable number of request per second with low retransmission rate and database servers are correctly loaded.

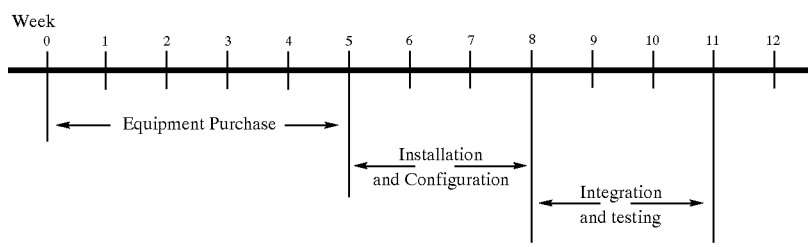

Post-Installation Management

The challenges begin after a Data Center goes production. Common Issues:

1. Internet Service Providers (ISP) instability—Internet backbone is getting more and more congested which means frequent short instability or outages. Having redundant routing protocol in place allows automatic Internet rerouting. This prevents complete outage of a Data Center. Instability is difficult to prevent. Usually, the connection gets very slow with many retransmissions but is reachable. Correcting these type of problems require manual intervention-like manually modify routing. That's the reason for having Internet connections from more than one ISP.

2. Server Version Upgrade Process—We frequently introduce new versions of Router, Server, and Feed Server for bug fixes, new features support, and efficiency improvement. Having a good migration strategy prevents unexpected problems. We typically pass through QA and Production Test Network, before slowly phase-in to production network.
3. System and Network Management—It is important to maintain a healthy network and perform growth projections. We are currently using in-house built tools, as well as commercial tools. HP Openview is our primary network management platform which provides realtime network analysis and alerts on error conditions. There are 3rd party integrated tools for indepth network troubleshooting and analysis-like RMON, Router Manager, etc. An in-house tool, called Inspector, provides realtime Server utilization graph with color-coded Router, Server, Database Server, and Feed Server load conditions. Database servers are managed by Platinum's DBvision and DBserver.
4. Content Processing—Content providers frequently introduce new features or format changes, sometimes without notice, that require ongoing maintenance on feed handling applications.
5. Version Control Process—Advertisement and Smart-Screen frequently require updates via version control process, as well as migration of new client versions. This is a very complicated process which involves mapping brand and version of the client and determines who should get what. This involves a lot of database table mapping and QA efforts.
6. Backup and Maintenance—All database servers should perform a hot backup on a daily basis and a cold backup on a weekly basis. Backing up management servers is also important. We don't recommend Server backup because they are identical and easy to rebuild. It is a good practice to store a complete set of backup tapes offsite on a monthly basis. To increase disk access efficiency and assure a virus free environment, disk defragmentation and virus scan are recommended to be performed on a weekly basis.
7. Transaction Logging and Advertisement statistics Processing—Do we need to log transactions? It provides lots of details of client behavior. How to store and upload advertisement statistics? It is needed to show advertisers.

Database Manager monitors and manages a PointServer's connections to its content databases.

Database Manager is one of the core server threads and is started up as a "normal" priority thread of the Service during server startup.

Database Manager has to be started up before Application Manager so that it can help in setting up Agent pools and is shutdown after the Application Manager has been successfully terminated during a normal shutdown. IA failure to start the Database Manger triggers the Server shutdown.

Database Manager maintains an in-memory structure to track status of all the databases currently being accessed by the various modules on the server. It uses this information to trigger failovers and failbacks appropriately.

Architecture

There are three modules in the Server which need access to the databases:
1. Service Agents to read the content and save the registration and upload information
2. Cache Manager to pre-fetch and refresh static Caches on the PointServers.
3. Transaction Manager to write the transaction log.

Each Service Agent requiring access to the databases creates and maintains a sharable database connections pool. This pool is established at the Server startup. The number of connections in the pool, primary database and secondary database can be specified by the Registry entries. A Database Manager thread provides means and resources to the Service Agents to manage their database pools.

The Database Manager helps in managing this pool in the following ways:
Database Manager checks periodically if all the pools are active—it triggers a repair if it sees dead or hung connection
Database Manager manages Database Failovers. Any thread (Client thread, Transaction Manager or Cache Manager) that experiences difficulty in accessing database posts a failover message to the Database Manager. The database Manager checks to see if it is a 'failover' condition and it triggers failover for all the connection pools currently under its management.
Inspector can post a message to Database Manager for failback. The Database Manager triggers failback of all connection pools to their Primary Databases on receiving this message.

Implementation

DBPoolCheckPoint

Provides a timer based call back to the ServiceAgents to do housekeeping on their DBPool.

Database Manager creates a worker thread and calls a pre-defined function::OnDBPoolTimer(intTimerId) for every Agent loaded on the Server.

This function can be customized by every Service Agent. In general it does following:
Check all DB Pools created by the Agent for list of locked connections. Any connection hanging for longer than the SESSION_TIMEOUT period is closed, deleted and re-created. This is done to re-claim the connections that were lost due to client session timing out.
Check all DB Pools for the total available connections. Available connections are the sum of free connections and the locked connections. They should be equal to the number specified in registry for this agent. If not, create connections to replenish the pool.
Make sure that all the free connections are still alive by 'ping'ing the server and re-establish them if needed.

DBPool Failover

When a data server fails, Database Manger creates worker threads and re-establishes all the connection in the pools to the backup Data Server.

The 'failure' is triggered when an error is returned from the database operation. The thread which experiences the error could be a Cache Manager, a Transaction Manager or a Client Process. The 'triggering thread' posts a 'FAILOVER' message to the Database Manager.

The Database Manager checks the status of Database. The database could be in one of the following states:
1. On Line
2. Failing Over If the status is OnLine, the Database Manger sets the status to 'Failing Over' and creates worker threads to run failover methods defined by the Transaction Manager, the Cache Manager and the Service Agents.

After Failover of all the pools is completed, the status of the Database is set to 'On Line' again.

If the status was already set to 'Failing Over' when a 'FAILOVER' message is received, the Database Manager discards it.

DBPoolFailback

When the Primary data server comes back on-line the Database Manager invokes another function in the Transaction Manager, Cache Manager and Service Agents to move the DBPool back to the Primary Data Server. Failback notification is provided from Inspector's Control Panel.

This documents describes the design specifications for Server URI cache. It covers the design goals, design considerations and subsequent decisions made. Many implementation guidelines are also suggested. This document doesn't cover the functional spec for the design. The ultimate goal for local cache is to reduce the number of trips to dataserver by using the data items already fetched to boost the server performance. To accomplish this, a local URI cache scheme is needed designed with the specific way Fido client fetches Server data.

Key Assumptions

The design of URI caching scheme is based on the following assumptions. Some are closely related to how Fido and the Server work. These will be key factors deciding how cache schemes are implemented.

- Fido client always fetches the latest articles regardless of what category is involved.
- There is an maximum number of articles each Fido request can get. This number is fixed depending on the category and searched items.
- The articles fetched always start from the latest one consecutively back to whatever number is specified. For iS example, 5 means the latest 5 articles.
- A single request of 500 stock quotes from datacenter every 5 minutes will have negligible overhead on Server.
- Datacenter has the capability to determine which set of data to cache when needed.
- The life span of each cached item is known to the cache.
- Disk space in the server will be assumed of less concern when there are trade-offs between space and time.

Design

Based on the above requirements, this session describes key design decisions and detailed descriptions on how URI caches functions.

Key Design Considerations

To satisfy the above described requirements with the listed assumptions, several key design issues need to be addressed. A very primitive cache operation is used as a reference to illustrate salient features of different design choices. Major design considerations will be needed to reduce synchronization cost and number of trips to the datacenter.

Generic Cache Operations

Figure 18:
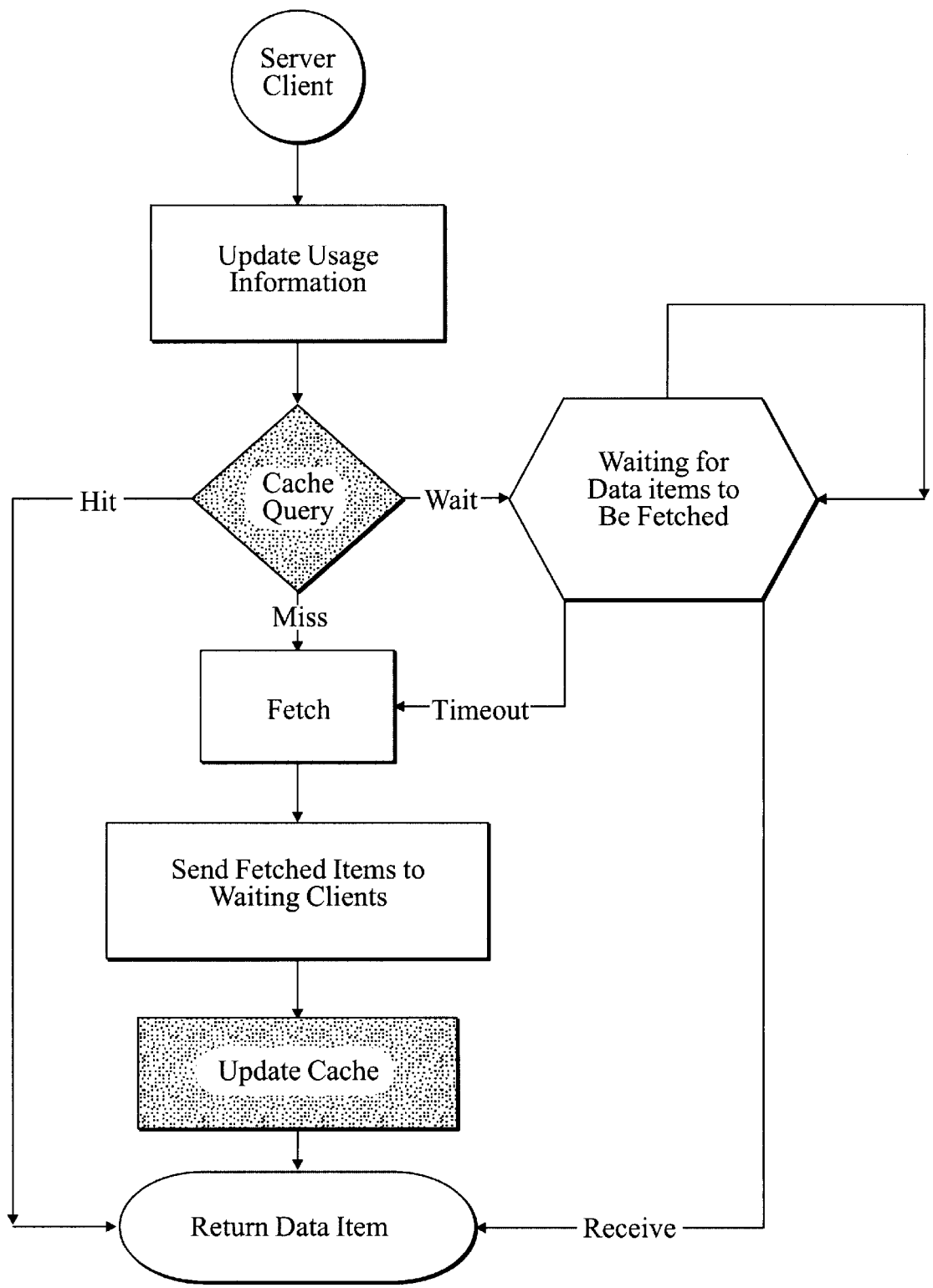
FIG. 18 is a flow diagram of the local cache logic in accordance with a preferred embodiment.

FIG. 18 is a flow diagram of the local cache logic in accordance with a preferred embodiment. There are three possible results when query the local cache, either hit, miss, or another client is already on its way to datacenter for the desired data items. Serialization is needed for both cache query and update (shaded blocks), because query might require an update on wailing client list, and cache update include deletion and addition to the cache storage and corresponding table. Since usage information will be used only as a heuristic guide to determine how cache should be updated (primarily what to delete), serialization is not needed.

With a cache update algorithm (e.g. LRU) in place, a very generic cache mechanism can be implemented. The overhead in serialization and cache management might be too expensive for the resulting cache performance, especially when it is not known how good the resulting hit ratio can be.

Use of Cache Manager

Figure 19:
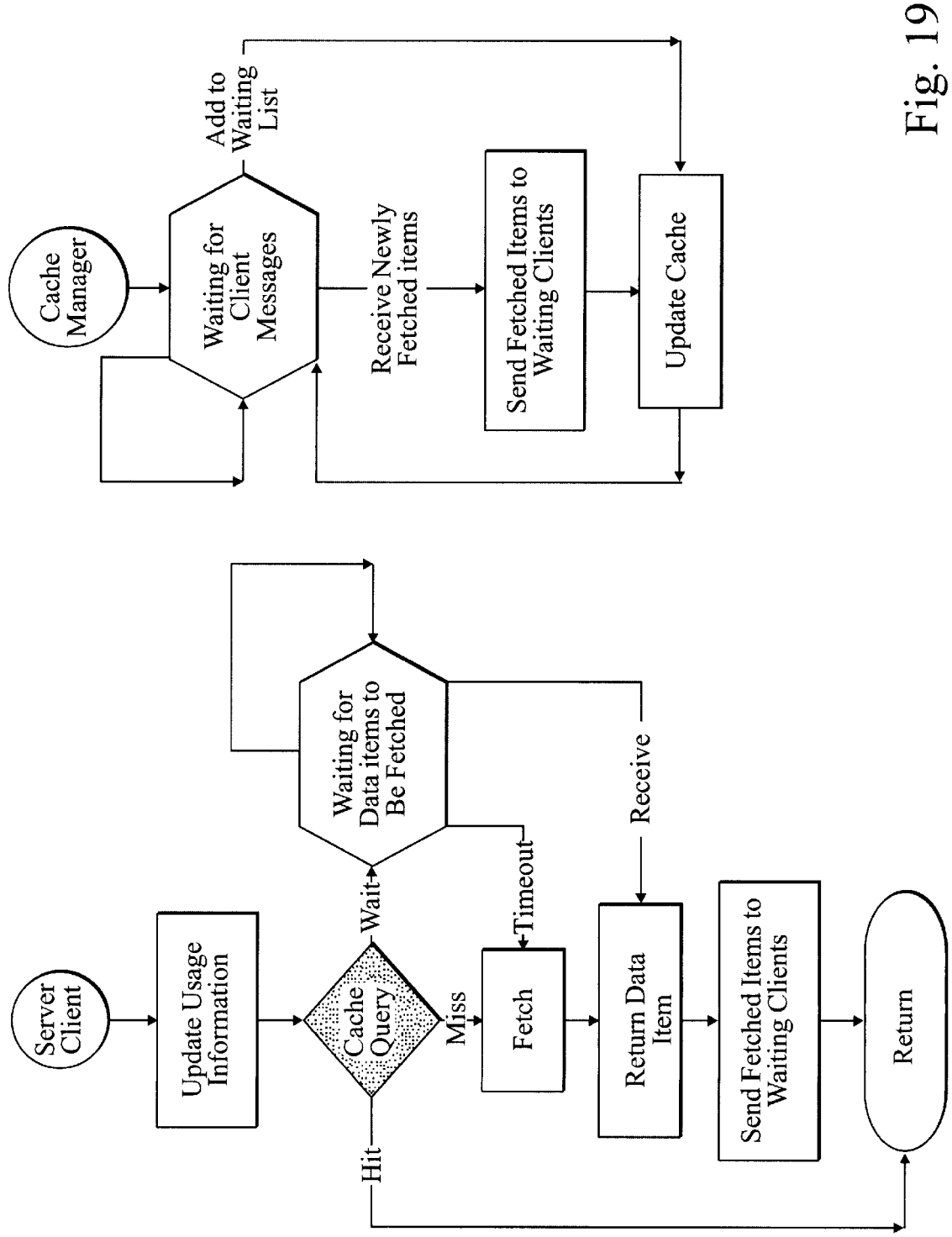
FIG. 19 shows how cache manager and server client work together in accordance with a preferred embodiment.

With the help of a cache manager thread for updating and managing cache, server client won't need to update cache after fetching data items. In addition, most changes regarding cache scheme can be done through cache manager, hence a clean interface between server client and cache is possible with increased flexibility. FIG. 19 show how a cache manager and server client work together in accordance with a preferred embodiment. Note that server client cache query will be serialized when cache manager updates the cache. The cache manager is associated with cache tables and a list of memory mapped files that implement the local cache storage. The granularity of synchronization is determined directly by the design of tables. The more the tables, the finer the synchronization granularity will be and the less the serialization bottlenecks with a cost of more synchronization resources.

Refreshing Cached Data

If the set of cached data changes much slower than the data itself, major cost of cache management will be the constant need to keep the cached set fresh. Number of trips to the datacenter and the subsequent management of caching the fetched data are to primary factors contributing to the cost. Variations on when and how these updates are done could have different effects on the caching performance. Taking advantage of the specific way Server data is fetched and relieving the consistency constraint between cached data and its corresponding part in the datacenter, some cost saving measures are possible.

With the knowledge of data item life span, two methods are possible to simplify cache management by refreshing cached data at every preset time interval. The basic idea is to update cache in one batch instead of many individual trips to the datacenter. Scheduled updating and database pull are two of the alternate methods for facilitating this processing.

Scheduled Update

At every scheduled time interval, the cache manager will fetch a fresh set of cached data items from datacenter, hence keep all the cached item in the database fresh all the time. This only applies when the selection of cached data set is stable relative to scheduled time interval. If the time interval is T, the age of cached data using the scheme is guaranteed to be no older than 2T.

Database Pull Update

This requires datacenter to send notification to cache manager whenever the data in the database has changed. Cache manager would respond by fetching a fresh set of data, hence guarantees the synchronization of database and cache to some acceptable degree. It is suitable when the selected set of cached data doesn't change often and the frequency of database update is low so the notification message won't clog the network. If the database is updated every interval T, this approach guarantees the age of cached items no older than T. FIG. 20 is a flow chart setting forth the cache logic simplified by adopting the scheduled cache data refreshing methods in accordance with a preferred embodiment. Note that the data fetched by the client is not passed over to the cache manager for it is assumed that cache miss occurs rarely.

Reducing Serialization by Extra Cache Copy

When the server client is not responsible for updating the cache, synchronization cost can be greatly reduced if extra space is traded and some latency between the cached data and datacenter base is allowed. The cache manager makes a new copy of cached data during updating while making the old one available for reading at the same time. It switches to the new copy when done and subsequent cache query will reference the new one instead. No server client needs to wait for cache update using this scheme. Some server clients might get the old data at the time cache is updated. However, this interval can be negligible for Server application. Using this method to the above displayed flow, the need to both cache query and update synchronization won't be needed.

Selection of Cached Data

The set of data cached for each category can be determined by a priori usage knowledge or on the fly usage information. Any items fetched should be cached whenever possible. However, there are constraints on storage size and performance penalty under multi-threaded environment. Some Server categories can take advantage of the fact that only the latest articles are fetched and there is a limitation on maximum number of articles allowed. Such knowledge makes implementation of cache easier.

On the fly usage information will be updated on each cache query and referenced when the set of cached items need to be changed. This information will be used primarily to determine which cache items to purge when there is a need to do so as new cache items are added. Examples of usage information can be as simple as to support "least recent used" or "least frequently used" cache purging scheme. URI cache manager design would allow the flexibility of using different methods in selecting the set of data to cache for different categories. Adding a new fetched item to cache incurs serialization penalty that other client threads would be locked out from accessing the cache before the update is complete. Although this cost can be justified if overall it is less than the time spent for trips to database, it should still be minimized as much as possible. This is possible when the cached set is quite stable relative to the life cycle of cached data and the scheduled update can be adopted. Under this condition, a separate cache table can be used to record new changes without interrupting current cache accessing. The new items will be cached in next time cache is updated.

Cache Hit/Miss Decision

Cache query will be based primarily on the lastID and search items of the incoming request. It could also uses the time stamp information to validate the cached data. When request comes with search items, all should be in the cache to be considered as hit. The sever client is responsible to package an URL from either or both the returned data items by cache query and datacenter fetch. This happens when search items are involved or when, for example, five out ten latest articles are to be returned rather than all ten.

Proposed URI Cache Schemes

Based on the above described design considerations, one cache manager is proposed to handle the local URI cache. It will maintain separate cache tables for different categories to reduce potential synchronization issues among different categories hence increase the flexibility to extend the design when needed. Under the current Server, there are 27 different categories. Based on the way Server data is fetched, different schemes are needed to implement the URI cache for different categories, depending on the life cycle of category data and the certainty on which set of data to fetch.

The following table lists the existing Server data category, how files are fetched, how often data are updated, and allowed delay between cache and database.

| | Fetched Files | Maximum Num. of Files Fetched | Update Frequency | Delay Allowed |
|---|---|---|---|---|
| Business News | Latest | 10 | low | 1 hour |
| Business Summary | Latest | 1 | hourly | 1 hour |
| Industry News | Latest | 10 | low | 1 hour |
| Entertainment News | Latest | 10 | low | 1 hour |
| Entertainment Variety News | Latest | 10 | low | 1 hour |
| Entertainment Variety Business | Latest | 10 | low | 1 hour |
| Entertainment News Summary | Latest | 1 | hourly | 1 hour |
| Entertainment Horoscopes | Latest | 1 | low | 1 hour |
| Entertainment Lottery | Latest | 1 | twice/day | 1 hour |
| Finance Historical | Selected Latest | 1 (per selection) | daily | 1 hour |
| Finance Current | Selected Latest | 1 (per selection) | per 15 min. | 5 min. |
| Finance Articles | Selected Latest | 10 (per selection) | low | 1 hour |
| Hot Site | ? | ? | ? | ? |
| National News | Latest | 10 | low | 1 hour |
| National News Summary | Latest | 1 | hourly | 1 hour |
| Washington News | Latest | 10 | low | 1 hour |
| Washington News Summary | Latest | 1 | hourly | 1 hour |
| International News | Latest | 10 | low | 1 hour |
| International News Summary | Latest | 1 | hourly | 1 hour |
| Sports News | Latest | 10 (per selection) | low | 1 hour |
| Sports News Summary | Latest | 1 | hourly | 1 hour |
| Version Software | All Latest | All | very low | 1 hour |
| Version AdPool | All Latest | All | very low | 1 hour |
| Version Screen Saver | All Latest | All | very low | 1 hour |
| Weather Maps | All Latest | All | twice/day | 1 hour |
| Weather Cities | All Latest | 1 | twice/day | 1 hour |
| Web Configuration | ? | ? | ? | ? |

With the assumption that all category data comes with explicit next update information and the above listed characteristics, the following schemes are proposed for a simple implementation of URI local cache using the scheduled fetching refreshing methods with extra copy of cached data. Memory mapped files will be used for cache storage. FIG. 21 is a flowchart of the proposed URI cache scheme in accordance with a preferred embodiment.

Note that server client cache query has an extra return called "none" which applies when the requesting client has already the most up to date information (i.e. latest articles) and there is no need to return anymore. Cache manager will use the next update information of the cached items to schedule fresh fetch of cache data for itself. Hence the updating message are basically timer message activated by the cache manager besides special notification messages from datacenter.

URI Cache Based on Scheduled Fetching with Fixed Cache Set For categories where the tolerance of data consistency is high (e.g. 1 hour difference) and the set of data to cache is fixed, scheduled update URI cache scheme is applicable.

Cache query is based on lastID using the cache table for the corresponding category. It will return all articles with more recent lastID. Cache query should result in either hit or none. Hit will return the list of articles the requesting client needs to be updated. Otherwise, it none would return without sending anything. Miss will happen when cache manager determines the cached data is corrupted and turn the itself off.

Cache manager is responsible to refresh the cache at scheduled interval according to the next update information embed in the cached items.

Protective mechanism using timeout and next update information would be used to protect any failure during scheduled fetch. When this occurs, the cache manager would retry the fetch while keep using the old cache data or turn off the cache for that particular category temporarily Datacenter would be able to send notification message to the cache manager to change the selection of cached data, for example the number of latest articles to cache for a particular category.

URI Cache Based on Scheduled Fetch with Stable Cache Set Assuming the set of data to be cached doesn't change that often, a similar scheme to the previous one can be applied to all categories supporting selection, namely Finance Current, Finance Historical, Finance Articles, and Sports News. The main difference is the additional responsibility of cache manager to schedule an update on a new set of cached data. Some implications for this scheme are:

Cache query returns hit/miss by whether all selected items are in the cache. Only when all items are found will be a hit, otherwise it would be a miss. For example, AAPL, INTC, and IBM are selected, but only AAPL and INTC are cached, query will results in miss. Miss will still return found cached items back. It is up to the server client to package them, if any, along with fetched items together.

Cache manager has two schedules, one for updating a fresh set of cache data and the other for selecting a new set of cached data. Cache data refreshing schedule is known. While when the set of cached data needs to change requires some tuning, or notification message from datacenter.

Usage information will be updated whenever fetches occurs. Since this usage statistics will be used only as a reference for cache manager to update a new cache selection, it needs not to be thread safe.

The size of cached data is predetermined in terms of number of data items. An initial selection of cached data is necessary. For example, stock quotes (Finance Current) will cache 500 hot stocks initially selected by known usage pattern.

Number of items covered in usage information table should be larger than that of cached data so change of the cached data set is possible.

Whether the cost of scheduled fetching by the cache manager is justifiable depends on the real hit ratio. Parameter to adjust include the cache size, selection criteria, selection set update frequency etc.

Two copy of caches will be used for cache manager to circumvent serialization problem.

When there is miss for cache query, trips to datacenter are needed. The newly fetched data won't be added back to cache by design. It is assumed that the serialization cost thus incurred is not worth the saving in further hit for the fetched item. Whether this assumption is correct remains to be seen.

Implementation Criteria

The following criteria should be followed for implementing URI local cache:

URI local cache interface with server should be done at the object level. Unplugging local URI cache should be done simply by not [p the cache object.

The implementation priority should follow the following order:
1. Fixed set based scheme: least complicated yet with the best guaranteed payoff.
2. Stable set based scheme: payoff unknown with the extra effort of implementing cache selection scheme, strong dependency of how accurate the "stable set" assumption holds.
3. General scheme: most complicated and most costly in terms of multi-thread serialization, extra tuning effort needed to see how effective URI local cache could achieve.

URI cache codes should be inherited from generic cache design with different scheme left as implementation details.

The proposed URI cache design depends on the availability of next update information from cached data. If this data won't be available during development, an alternative scheme of preset fixed time interval cache refreshing scheme will be adopted.

Rose/Solo will be the tools used to document the design at the object design/analysis level.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A server computer for communicating with a client computer via a network, the server computer comprising:

a server interface for receiving a client computer request including a category identifier associated with a category of the client computer request and a last file identifier of a last file previously sent to the client computer, the client computer request being created by the client computer using information from a local file residing on the client computer; and a request processing component for receiving the client computer request from the server interface and for assigning the client computer request to one of a plurality of agents operating on the server based upon the category identifier, the request processing component transmitting information provided by the one of the plurality of agents to the client computer, said plurality of agents utilizing the last file identifier and the information from the local file to retrieve information from the server computer, to redirect client computer requests to a certain computer, to provide statistical information and to enable an internal organization channel.

2. The server computer as recited in claim 1, in which a plurality of server computers are utilized for servicing client computer requests and load balancing is performed by selecting a server computer with the lightest load to service a client computer request.

3. The server computer as recited in claim 1, in which a plurality of server computers are utilized for servicing client computer requests and failure of a first server computer triggers servicing of a client computer request by a second server computer.

4. The server computer as recited in claim 1, wherein the network uses a TCP/IP compliant protocol for transmissions.

5. The server computer as recited in claim 1, in which the client computer transmits a http proxy_GET request to the server computer to initiate redirection.

6. The computer system as recited in claim 5, including a private channel between the client computer and the server computer.

7. The server computer as recited in claim 1, in which the server computer receives requests, processes the requests and returns information to the client computer.

8. A method for servicing a client computer request by a server computer communicating with a client computer via a network, comprising:

creating the client computer request using information from a local file residing on the client computer;

receiving the client computer request by the server computer, the client computer request including a category identifier associated with a category of the client computer request and a last file identifier of a last file previously sent to the client computer;

assigning the client computer request to one of a plurality of agents based upon the category identifier, said plurality of agents operating on the server computer to retrieve information from the server computer, to redirect client computer requests to a certain computer, to provide statistical information and to enable an internal organization channel; and processing the client computer request by the one of the plurality of agents utilizing the last file identifier and the information from the local file.

9. The method as recited in claim 8, in which a plurality of server computers are utilized for servicing client computer requests and load balancing is performed by selecting a server computer with the lightest load to service a client computer request.

10. The method as recited in claim 8, in which a plurality of server computers are utilized for servicing client computer requests and failure of a first server computer triggers servicing of a client computer request by a second server computer.

11. The method as recited in claim 8, wherein the network uses a TCP/IP compliant protocol for transmissions.

12. The method as recited in claim 8, in which the client computer transmits a http proxy_GET request to the server computer to initiate redirection.

13. The method as recited in claim 12, wherein a private channel is provided for coupling the client computer and the server computer.

14. The method as recited in claim 8, in which the server computer receives requests, processes the request and returns information to the client computer.

15. A computer-readable medium comprising instructions, which when executed on a processor, perform method for servicing a client computer request by a server computer communicating with a client computer via a network, comprising:

creating the client computer request using information from a local file residing on the client computer;

receiving the client computer request by the server computer, the client computer request including a category identifier associated with a category of the client computer request and a last file identifier of a last file previously sent to the client computer;

assigning the client computer request to one of a plurality of agents based upon the category identifier, said plurality of agents operating on the server computer to retrieve information from the server computer, to redirect client computer requests to a certain computer, to provide statistical information and to enable an internal organization channel; and processing the client computer request by the one of the plurality of agents utilizing the last file identifier and the information from the local file.

16. The computer-readable medium as recited in claim 15, in which a plurality of server computers are utilized for servicing client computer requests and load balancing is performed by selecting a server computer with the lightest load to service a client computer request.

17. The computer-readable medium as recited in claim 15, in which a plurality of server computers are utilized for servicing client computer requests and failure of a first server computer triggers servicing of a client computer request by a second server computer.

18. The computer-readable medium as recited in claim 15, wherein the network uses a TCP/IP complaint protocol for transmissions.

19. The computer-readable medium as recited in claim 15, in which the client computer transmits a http proxy_GET request to the server computer to initiate redirection.

20. The computer-readable medium as recited in claim 19, including supporting a private channel between the client computer and the server computer.

21. The computer-readable medium as set forth in claim 15, in which the server computer receives requests, processes the requests and returns information to the client computer.

* * * * *